United States Patent
Henderson et al.

(10) Patent No.: US 6,537,405 B1
(45) Date of Patent: *Mar. 25, 2003

(54) SPIRAL FORMED PRODUCTS AND METHOD OF MANUFACTURE

(75) Inventors: Randal Henderson, Franklinton, NC (US); Eduardo Lauer, Zebulon, NC (US); Michael Allman, Wilson, NC (US); Jeremy Fetvedt, Garner, NC (US)

(73) Assignee: Nomaco, Inc., Zebulon, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/757,345

(22) Filed: Jan. 9, 2001

Related U.S. Application Data

(63) Continuation-in-part of application No. 09/153,508, filed on Sep. 15, 1998, now Pat. No. 6,306,235.
(60) Provisional application No. 60/061,985, filed on Oct. 16, 1997.

(51) Int. Cl.[7] .......................... B29C 31/00; B29C 31/08; B29C 39/14
(52) U.S. Cl. .................. 156/195; 156/184; 156/229; 156/425; 156/426
(58) Field of Search .................. 156/193, 195, 156/426, 428, 446, 244.11, 250, 425, 429, 443, 184, 189, 191, 229

(56) References Cited

U.S. PATENT DOCUMENTS

| | | | |
|---|---|---|---|
| 1,519,522 A | 12/1924 | Weigel | |
| 2,442,946 A | 6/1948 | Barton | |
| 2,671,939 A | * 3/1954 | Everhart et al. | |
| 3,083,131 A | 3/1963 | Wentz | |
| 3,413,388 A | * 11/1968 | Lux et al. | 264/45.4 |
| 3,436,290 A | 4/1969 | Reissner | |
| 3,477,891 A | 11/1969 | Hawerkamp | |
| 3,910,808 A | 10/1975 | Steward | |
| 3,917,500 A | * 11/1975 | Petzetakis et al. | 156/195 |
| 3,943,224 A | 3/1976 | Drostholm | |
| 3,954,929 A | * 5/1976 | Hoenke | 264/45.5 |
| 3,984,271 A | 10/1976 | Gilbu | |
| 3,988,190 A | 10/1976 | McWilliams | |
| 4,118,814 A | 10/1978 | Holtom | |

(List continued on next page.)

FOREIGN PATENT DOCUMENTS

| | | |
|---|---|---|
| GB | 626945 | 7/1949 |
| NL | 85258 | 6/1957 |

*Primary Examiner*—Richard Crispino
*Assistant Examiner*—Sue A. Purvis
(74) *Attorney, Agent, or Firm*—Melvin I. Stoltz

(57) ABSTRACT

In the present invention, hollow thermoplastic foam tubes of any desired diameter are easily achieved as well as large sheets or planks of thermoplastic foam material in any width and thickness desired by spirally wrapping and fusing a thermoplastic foam profile having a desired size and shape. By employing a thermoplastic foam extruder to produce a profile having a desired cross-sectional shape or configuration, and advancing the profile onto a rotating support member for being wrapped peripherally surrounding the rotating support and continuously bonding the abutting edges of the profile as the profile is spirally wound, a unique spiral forming and product manufacturing procedure and system is realized. By employing this unique spiral forming process, a hollow cylindrical thermoplastic foam tube is formed on a continuous basis, with the length thereof being controlled only by the needs of the customer. In addition, any desired diameter can be formed, by employing one or more cooperating rotating support members having a desired diameter, with the thickness of the tube being controlled by the thickness of the profile formed by the extrusion equipment.

39 Claims, 10 Drawing Sheets

U.S. PATENT DOCUMENTS

| | | |
|---|---|---|
| 4,343,672 A | 8/1982 | Kanao |
| 4,353,763 A | 10/1982 | Simons |
| 4,362,187 A | 12/1982 | Harris et al. |
| 4,415,392 A | 11/1983 | Komori |
| 4,459,168 A | 7/1984 | Anselm |
| 4,466,854 A | 8/1984 | Hawerkamp |
| 4,613,389 A | 9/1986 | Tanaka |
| 4,783,230 A | 11/1988 | Perkins |
| 4,824,502 A * | 4/1989 | Nagayoshi et al. ......... 156/195 |
| 4,826,423 A | 5/1989 | Kemp et al. |
| 4,968,368 A | 11/1990 | Moody |
| 5,261,988 A | 11/1993 | Dikis et al. |
| 5,358,580 A | 10/1994 | Miyamura et al. |
| 5,382,399 A | 1/1995 | Moret de Rocheprise et al. |
| 5,396,755 A | 3/1995 | Arnold |
| 5,411,619 A | 5/1995 | Sundqvist et al. |
| 5,468,207 A | 11/1995 | Bower et al. |
| 5,476,562 A | 12/1995 | Inhofe, Jr. |
| 5,480,505 A | 1/1996 | Andre |
| 5,586,963 A | 12/1996 | Lennon et al. |
| 5,591,292 A | 1/1997 | Blomqvist |
| 5,637,168 A | 6/1997 | Carlson |
| 5,798,013 A * | 8/1998 | Brandenburger ............ 156/188 |
| 6,306,235 B1 * | 10/2001 | Henderson ................. 156/195 |

* cited by examiner

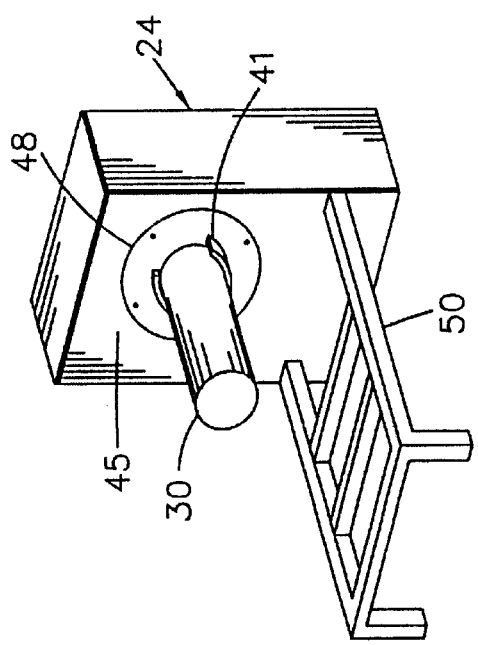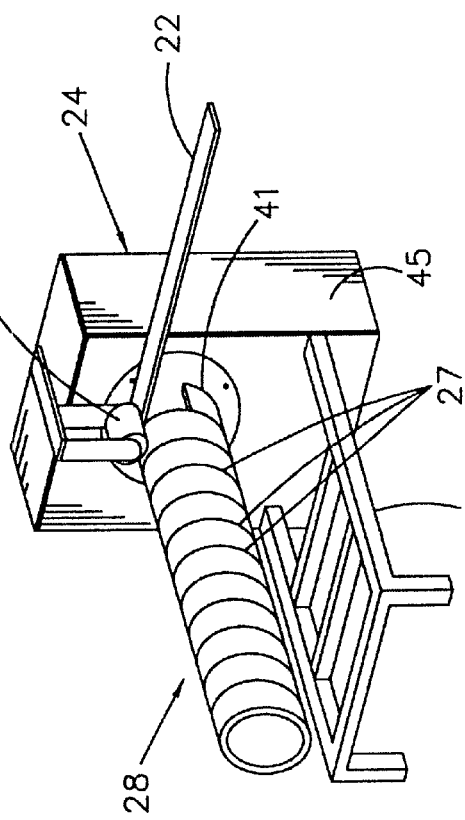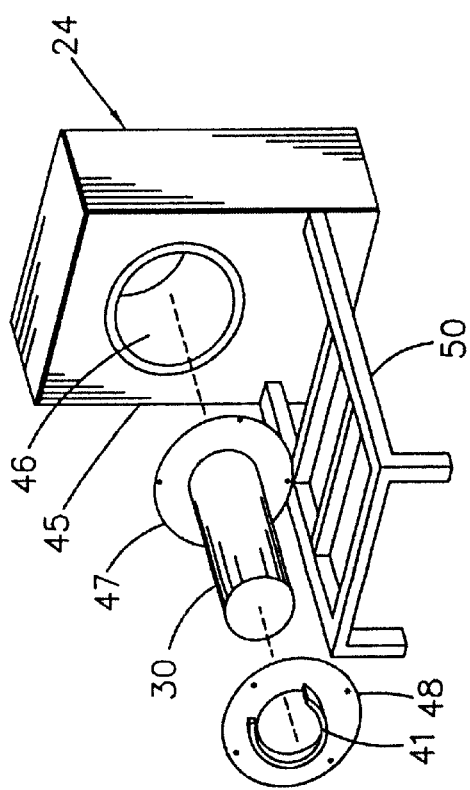

SPIRAL FORMED PRODUCTS AND METHOD OF MANUFACTURE

RELATED APPLICATIONS

This application is a CIP of U.S. patent application, Ser. No. 09/153,508, filed Sep. 15, 1998 entitled SPIRAL FORMED PRODUCTS AND METHOD OF MANUFACTURE now U.S. Pat. No. 6,306,235 which claims benefit to U.S. Provisional Application Serial No. 60/061,985 filed Oct. 16, 1997.

TECHNICAL FIELD

This invention relates to foamed thermoplastic products and methods for manufacture and, more particularly, to foamed thermoplastic products manufactured by continuous formation in a substantially cylindrical configuration.

BACKGROUND ART

During the last few decades, substantial effort has been expended and interest has developed in the formation and construction of products using foamed thermoplastic materials. Typically, these products are formed either by foamed extrusion or molding. However, regardless of which method is employed, production limitations exist on the size and shape in which products can be efficiently produced at competitive prices.

One example of the type of products produced using the extrusion process is the creation of hollow elongated cylindrical tubes formed from foamed thermoplastic material. These tubes are used in a wide variety of products, most typically as insulation for fluid carrying pipes or conduits.

Although the extrusion manufacturing process for forming foamed cylindrically shaped thermoplastic tubes has progressed over the years to an extremely efficient production system, tube diameters greater than about seven inches are incapable of being produced on conventional equipment. Even though a substantial market exists for large diameter tubes formed of thermoplastic material, this demand cannot be satisfied using conventional extrusion equipment. Large diameter foam tubes require manufacturers to invest in the purchase of extremely expensive manufacturing equipment, before this demand can be met using current technology.

In view of the substantial investment that must be made by manufacturing companies in obtaining equipment for satisfying the industry needs for larger diameter cylindrical tube members, the products produced to meet this demand are extremely expensive, when compared to the conventional price for smaller diameter thermoplastic tubes. However, in spite of the demand for such products and the industry desire for competitive prices, prior art technology has failed to provide a manufacturing method capable of producing large diameter cylindrical tubes in a cost effective, price competitive manner.

In addition to the industry demands for larger diameter, hollow, cylindrical tubes, substantial demand also exists for foamed thermoplastic material formed in large sheet form in a wide range of thicknesses. Generally, conventional, lower cost extrusion equipment for forming foamed thermoplastic products is incapable of producing foamed polymer sheets having widths greater than about 12" with a thickness of about ½". Consequently, the demand for large width foam plastic sheet is incapable of being satisfied by conventional manufacturers having lower cost extrusion equipment. In order to satisfy the industry needs for larger and thicker products, extremely expensive, custom designed equipment must be purchased, causing the large width foam sheet products produced thereby to be more costly. In addition, the return of capital for this investment is low.

Although the specialized manufacturers who own this expensive equipment are capable of producing foamed thermoplastic sheet material in large width configurations, these manufacturers are still limited in the thickness that can be produced in a single sheet, unless substantially greater investments are made for this production equipment. Typically, without expensive enhancements, prior art sheet extruders are capable of producing sheet material having a maximum thickness of about ½".

Consequently, any customer desiring to have a final product thicker than ½", is required to have the product produced by extremely costly manufacturing equipment or by employing a plurality of sheets which are cut to size and integrally bonded to each other in order to build up a final product to the desired thickness. As a result, additional manufacturing and handling expenses are incurred and the final product produced by these specialized procedures is substantially increased in cost.

In order to produce plank material in thicknesses greater than ½" without expensive equipment, a plurality of sheets must be laminated or bonded together in secondary processes, increasing the thickness of the profile by ½" with each process. Such lamination steps substantially increase the complexity of the manufacturing procedures as well as increasing the overall scrap rates.

In an attempt to enable plank material to be produced in thicknesses greater than ½", accumulators have been constructed and used with extruders. By employing an extruder/accumulator combination, the foamed plastic is transferred directly from the extruder in the accumulators until the accumulator is filled. Then, using a piston or ram, the accumulated plastic is forced out of the accumulator. Using this system, planks with thicknesses up to 2" can be achieved. However, this process is inefficient, since it must be run intermittently and cannot be operated continuously. Furthermore, a high scrap rate is obtained due to the intermittent stop/start process.

As is evident from these systems, in spite of the demand for improved manufacturing techniques, no effective prior art manufacturing system has been developed for reducing the costs involved.

Consequently, it is a principal object of the present invention to provide a method for manufacturing large diameter foam tubes and foam plastic sheet material, using a production method which is easily achieved, highly effective, and comparatively inexpensive.

Another object of the present invention is to provide a new manufacturing process having the characteristic features described above which enables larger diameter hollow cylindrical tubes and large foam sheet material to be produced in an extremely cost efficient manner.

Another object of the present invention is to provide a new manufacturing process having the characteristic features described above which is capable of being employed with minimum of manpower and optimum production rates.

Other and more specific objects will in part be obvious and will in part appear hereinafter.

SUMMARY OF THE INVENTION

By employing the present invention, all of the difficulties and drawbacks found in prior art systems are eliminated and hollow thermoplastic foam tubes of any desired diameter are easily achieved as well as large sheets or planks of thermoplastic foam material in any width and thickness desired. In the present invention, all of the complex, expensive equipment previously required to satisfy industry needs for these products are eliminated and an easily employed, unique manufacturing process is used.

In accordance with the present invention, a thermoplastic foam extrusion system is employed to produce a profile having any desired cross-sectional shape or configuration, with the profile being advanced onto a rotating cylindrical sleeve. As the foam profile is wrapped peripherally surrounding the rotating sleeve, the abutting edges of the profile are continuously fused to each other in a spiral forming, manufacturing operation. In its preferred embodiment, the elongated extruded thermoplastic profile is advanced onto the rotating cylindrical sleeve at any desired angle which enables the profile to be continuously, longitudinally advanced along the length of the sleeve as the side edge of the incoming profile is bonded to the edge of the adjacent, wrapped profile in a generally continuous, spiral forming manner.

By employing this unique spiral forming process, a hollow cylindrical thermoplastic foam tube is formed on a continuous basis, with the length thereof being controlled only by the need of the customer. In addition, any desired diameter can be formed by employing a rotating sleeve constructed with an external diameter substantially equal to the internal diameter desired for the product. Both the thickness and outer diameter of the tube is controlled by the thickness of the profile formed by the extrusion equipment.

Using an alternate embodiment of the present invention, the hollow, cylindrical, thermoplastic foam tube constructed using the teaching of the present invention can be formed comprising virtually any desired overall diameter. In this alternate embodiment of the present invention, a plurality of separate and independent cooperating rotating sleeves or mandrels are employed, spaced apart in any desired configuration, with the cylindrical tube being formed by wrapping the extruded thermoplastic profile about the plurality of rotating sleeves or mandrels in a continuous forming operation.

In the simplest form, two separate and independent sleeves/mandrels are employed, positioned in juxtaposed, spaced, relationship to each other, with each sleeve/mandrel rotating about substantially parallel axes. Using a single thermoplastic foam extrusion system, a profile having the desired cross-sectional shape or configuration is produced with the profile being advanced onto the first rotating sleeve/mandrel. Then, instead of being continuously wrapped about the single rotating sleeve/mandrel in a generally spiral configuration, as in the previous embodiment, the elongated extruded thermoplastic profile is advanced from the first sleeve/mandrel to the second sleeve/mandrel. At the second sleeve/mandrel, the extruded foam profile is wrapped about the outer surface thereof a sufficient distance to enable the foam profile to be returned to the first sleeve/mandrel. This process is then continuously repeated, forming an elongated, oval-shaped cylindrical thermoplastic, foam tube having any desired length.

By employing this continuous spiral forming and/or wrapping process, a hollow, generally oval shaped, cylindrical thermoplastic, foam tube is formed in a continuous production basis, with any desired length being easily achieved. In addition, the overall dimensions and configuration of the hollow thermoplastic, foam tube being produced is virtually unlimited, with the size and configuration of the foam tube being totally dependent upon the relative positions of the plurality of cooperating, rotating sleeves/mandrels. As a result, virtually any configuration or dimension is capable of being created using the unique process and the equipment of the present invention.

As of the foam profile is brought into engagement about the outer surface of the first sleeve/mandrel, as detailed above in reference to the single rotating sleeve/mandrel, the abutting side edges of the thermoplastic foam profile are continuously affixed to each other. As detailed herein, this affixation process is achieved typically using either mechanical or physical agents or systems. Typically, affixation of the side edges of the thermoplastic foam profile is achieved using one selected from the group consisting of bonding agents, such as adhesives, glues, and the like, or physical affixation systems such as heating of the side edges to a melt temperature and pressing the side edges to together to integrally affix the foam material to itself.

In securely affixing or bonding the side edges of the thermoplastic foam material to form the desired enlarged, oval-shaped cylindrical, thermoplastic foam tube, the affixation or bonding of the side edges is preferably achieved in the area of the first rotating sleeve or mandrel. However, the precise location of the affixation/bonding equipment for achieving the desired interengagement may be varied, depending upon the process being employed.

In general, it has been found that the side edges of the thermoplastic foam profile may be affixed to each other as the profile is advanced into engagement with the first rotating sleeve/mandrel. However, if desired, in the use of this alternate embodiment, the affixation system may be positioned between the first and second rotating sleeves/mandrels without departing from the scope of this invention. Furthermore, any alternate configuration or position for the affixation equipment can be implemented, without departing from the scope of this invention.

In one preferred embodiment of the present invention, two separate and independent rotating sleeves or mandrels are employed with one mandrel being rotationally mounted in a fixed location, while the second sleeve/mandrel is mounted for cooperative rotation with the first sleeve/mandrel while also being movable into a plurality of alternate positions. Preferably, the movable sleeve/mandrel is movable in its entirety along a single plane, enabling the central axis thereof to be in the same plane as the central axis of the first sleeve/mandrel, regardless of the position of the second sleeve-mandrel.

In this way, the spaced distance between the central axis of each of the two rotating sleeves/mandrels can be varied by the user, depending upon the size of the oval-shaped thermoplastic tube desired for production. By employing this configuration of the present invention, the overall diameter of the oval-shaped thermoplastic tube being produced is capable of being easily adjusted through a wide range of alternate diameters.

By employing this embodiment of the present invention, foam profile support means is preferably incorporated into the system for supporting the thermoplastic foam profile as the profile advances between the first and the second rotating sleeves/mandrels. Typically, the foam profile support means is required to a greater extent at the beginning of the formation process, particularly when the foam profile is being affixed to itself. Once affixation of the side edges of the profile has been completed, the inherent strength of the foam profile becomes self supporting.

As is evident from this disclosure, a highly efficient, low-cost manufacturing process is realized which is capable of producing hollow cylindrical tubes formed of thermoplastic foam material with the tube comprising any desired thickness and any desired diameter. Furthermore, by cutting the elongated formed tube at any desired length, products are produced to the precise specification desired by the customer.

In addition to providing a hollow cylindrically shaped, elongated foam plastic tube having any desired diameter, wall thickness, and length sought by a customer, the process of the present invention also achieves a hollow cylindrical tube member having any cross-sectional shape, configuration, or aperture pattern desired by a customer. As is well known in the art, expanded foam plastic extrusions may be formed with any desired cross-sectional shape, overall configuration, aperture pattern and the like as part of the formation process. Consequently, by employing these known formation techniques in combination with the spiral forming process of the present invention, cylindrical tubes may be formed incorporating a particularly desired pattern or configuration. In this way, enhanced flexibility and product design capabilities far beyond current manufacturing techniques are attained by employing the present invention.

A further feature provided by the unique manufacturing process of the present invention is the ability to produce cylindrically shaped hollow tubes having any desired wall thickness, diameter, and overall configuration along with the further ability to provide said hollow cylindrical tube members incorporating two or more layers integrally bonded to each other. By employing conventional techniques, such as co-extrusion, cross-head extrusion, or in-line bonding or fusing, one or more layers of additional material can be bonded to the initial extruded layer of foam plastic emanating from the extrusion equipment.

Once the additional layer or layers of material have been bonded to the base layer or profile, as desired, the multilayer profile is advanced onto the spiral forming manufacturing equipment of the present invention. In this way, the precise multi-layered, hollow, cylindrical component sought by the customer is attained in any desired diameter and thickness. By employing this technique, substantially enhanced speed and production capabilities are realized as well as the attainment of products which had previously been unattainable using conventional, known manufacturing techniques.

In addition to providing the uniquely constructed hollow cylindrical tubes detailed above, the spiral forming process of the present invention also provides substantially flat sheets or planks of any desired thermoplastic material. It has been found that by initially forming a cylindrical tube in the manner detailed above and then longitudinally cutting or slitting the wall of the tube, the spiral formed material opens into a substantially flat sheet or plank of foamed thermoplastic material.

By employing this manufacturing process, large width thermoplastic foam sheets or planks are formed with any desired thickness or configuration, eliminating the expensive prior art multi-step operations or the use of extruders and accumulators, which are required for attaining similar product constructions. Furthermore, the present invention is capable of attaining a flat sheet or plank of thermoplastic material which is formed in any configuration or pattern required by a consumer. In addition to these features, the present invention also achieves an easily produced, comparatively inexpensive foam thermoplastic sheet or plank member which comprises a plurality of layers of different materials which have been fused or bonded together to form any desired configuration or construction sought by the user.

As detailed above, the present invention attains sheet or plank material formed in a single step with the final product comprising any desired specification sought by the user. As a result, the entire sheet or plank manufacturing industry is revolutionized by this invention with the final product being attained using conventional extrusion equipment. Consequently, costs for producing any desired product are substantially reduced.

As is evident from the foregoing disclosure, the present invention is capable of achieving hollow cylindrical tubes formed of foamed thermoplastic material in any desired diameter and thickness as well as substantially flat sheet or planks of foamed thermoplastic material in any desired thickness, configuration, or visual appearance in a manner which is produced economically, simply, and directly without employing expensive, specially designed equipment. Furthermore, scrap material is reduced, and smaller batches or quantities of material can be manufactured in any color, size, product formulation, etc. desired by a user. Since small quantities can be produced, extensive inventories are eliminated and significant cost reductions are realized.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

THE DRAWINGS

For a fuller understanding of the nature and objects of the present invention, reference should be had to the following detailed description, taken in connection with the accompanying drawings, in which:

FIG. 4 is an exploded perspective view depicting the rotating mandrel assembly employed in forming the hollow tubes of the present invention;

FIG. 5 is a perspective view of the fully assembled rotating mandrel system depicted in FIG. 4;

FIG. 6 is a perspective view of the rotating cylindrical mandrel of FIG. 5 depicted in the process of forming a hollow tube member thereon;

DETAILED DESCRIPTION

By referring to FIGS. 1–20, along with the following detailed disclosure, the construction of the manufacturing equipment, the process of the present invention, and the uniquely constructed products attainable with the present invention can all be best understood. However, as will become evident from this detailed disclosure, variations may be made in the manufacturing equipment, the method steps, and the resulting products without departing from the scope of this invention. Consequently, the embodiments disclosed herein, and shown in FIGS. 1–20, are intended as examples of the present invention and not as limitations thereof.

Figure 1:
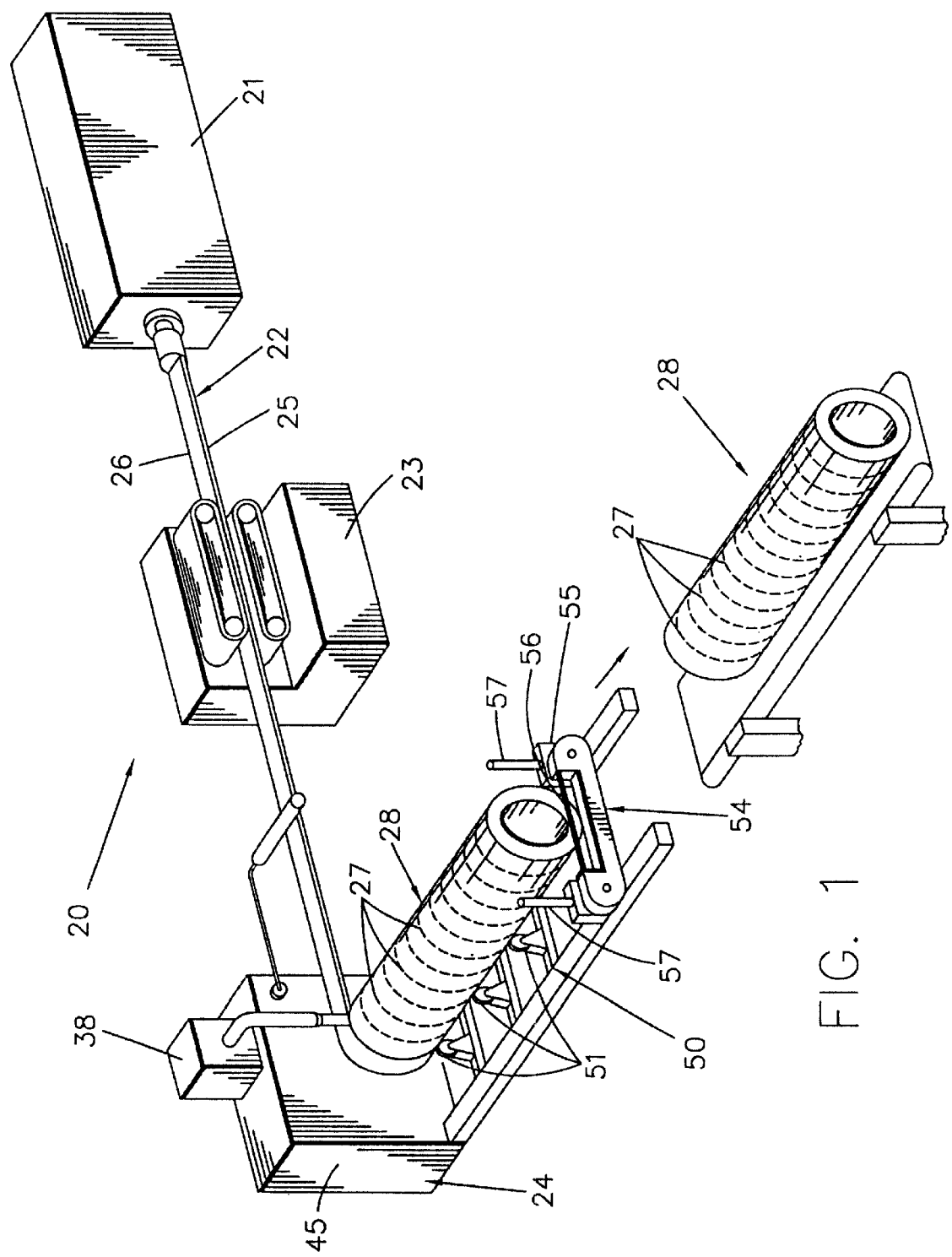
FIG. 1 is a perspective view of the manufacturing equipment employed in producing the spiral formed cylindrical tubes in accordance with the present invention.

In FIG. 1, one preferred embodiment of product forming system 20 of the present invention is fully disclosed. In this embodiment, product forming system 20 comprises an extruder 21, having a generally conventional configuration, which produces foamed thermoplastic profile 22, in any desired configuration, having side edges 25 and 26. Puller 23 is employed for continuously drawing foamed thermoplastic profile 22 from extruder 21 and feeding profile 22 to tube forming machine 24.

In employing this invention, any thermoplastic material can be used to form profile 22. However, the preferred thermoplastic material comprises one or more selected from the group consisting of polystyrenes, polyolefins, polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, and copolymers of polypropylene.

In accordance with the construction of this embodiment of the present invention, as shown in FIGS. 1, 2 4, and 5, tube forming machine 24 is constructed for receiving foam thermoplastic profile 22 on continuously rotating sleeve or mandrel 30 in a manner which causes profile 22 to be wrapped around rotating mandrel 30 of tube forming machine 24, continuously forming a plurality of spirally wound convolutions 27, in a side-to-side abutting relationship. In this way, the incoming continuous feed of foamed thermoplastic profile 22 is automatically rotated about mandrel 30, in a generally spiral configuration, causing side edge 25 of incoming profile 22 to be brought into abutting contact with side edge 26 of previously received and wrapped convolution 27. By affixing or bonding abutting side edges 25 and 26 to each other at this juncture point, substantially cylindrical, hollow tube 28 is formed.

Figure 3:
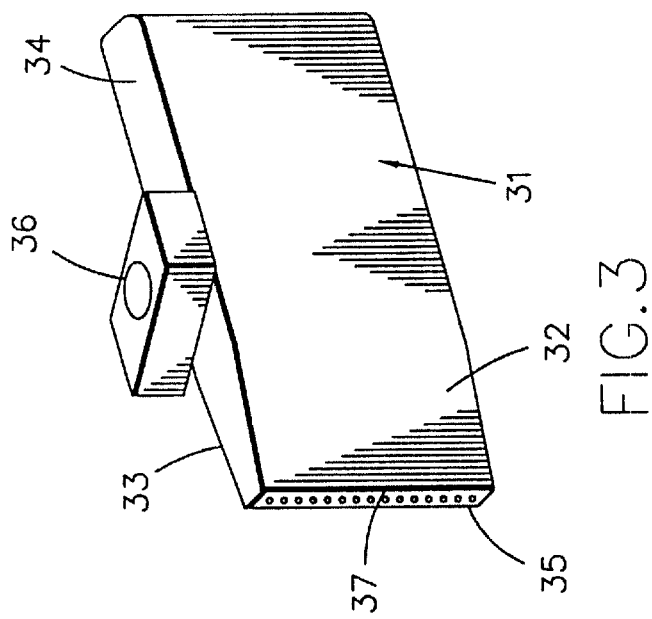
FIG. 3 is a perspective view of the preferred embodiment of the bond forming head employed in the equipment depicted in FIG. 2.

In order to provide integral bonded or affixed engagement of side edge 25 of profile 22 with side edge 26 of convolution 27, a bonding or fusion head 31 is employed. If desired, bonding/fusion head 31 may comprise a variety of alternate constructions in order to attain the desired, secure, affixed, bonded interengagement of edge 25 with edge 26. In the preferred embodiment, as depicted in FIGS. 2 and 3, bonding/fusion head 31 employs heated air.

In this preferred embodiment, bonding/fusion head 31 is constructed from heat conductive material and formed as a hollow housing which comprises side surfaces 32 and 33, top surface 34 and edge 35. By delivering heated air to head 31 through portal 36 formed in top surface 34, the temperature of surfaces 32 and 33 of head 31 are elevated to a level which enables the side edges of profile 22 and convolution 27 which contacts head 31 to be raised to their melting point. In addition, in the preferred embodiment, head 31 also comprises apertures 37 formed in edge 35 which delivers a continuous flow of hot air directly to side edges 25 and 26, assuring that the melting temperature is reached and edges 25 and 26 are securely fused or bonded to each other.

Figure 2:
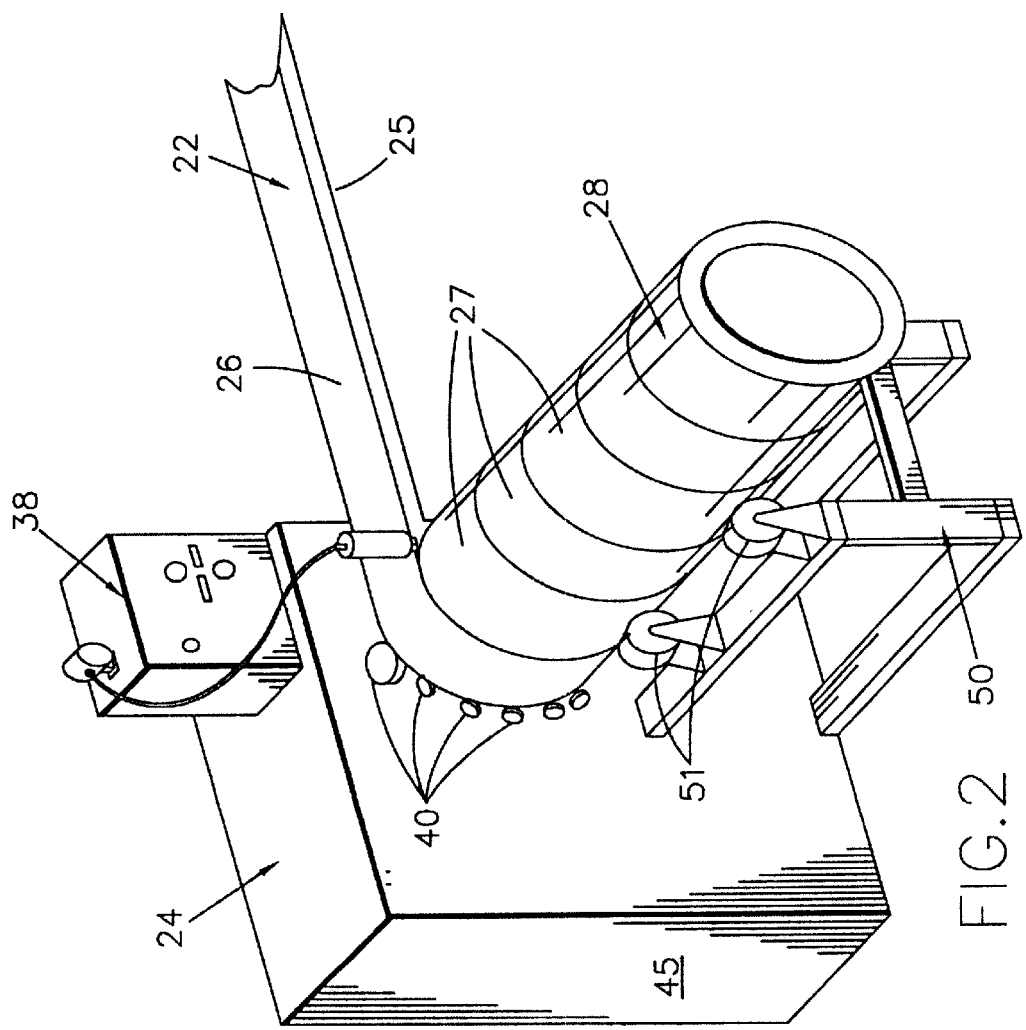
FIG. 2 is a perspective view, greatly enlarged, of one portion of the equipment depicted in FIG. 1 wherein the bonding operation employed to form the hollow tube member of the present invention is depicted.

As best seen in FIG. 2, bonding/fusion head 31 is positioned at the juncture zone at which side edge 25 of incoming profile 22 is brought into contact with side edge 26 of the previously received and spiral wrapped convolution 27. By causing bonding/fusion head 31 to simultaneously contact side edge 25 and side edge 26 of these components of profile 22, the temperature of the surfaces is raised to the melting point thereof, enabling the contact of side edge 25 of incoming profile 22 to be brought in direct contact with side edge 26 of first spiral wrapped convolution 27 in a manner which causes the surfaces to be intimately bonded to each other.

In the preferred construction, as depicted in FIGS. 1 and 2, tube forming machine 24 comprises a hot air generator 38, which is connected directly to bonding/fusion head 31 to deliver the desired heated air to bonding/fusion head 31. Although heated air is preferred for this bonding operation, alternate affixation means may be employed without departing from the scope of this invention. One such alternative is the use of heated adhesives applied directly to the side edges.

Tube forming machine 24 also preferably incorporates means for receiving profile 22 as it contacts rotating mandrel 30 and for guiding profile 22 onto mandrel 30 to form convolutions 27. In the embodiment depicted in FIG. 2, a plurality of guide rollers 40 are employed which are constructed with differing diameters to impart the desired position to profile 22 relative to mandrel 30, enabling profile 22 to be advanced onto rotating mandrel 30 in the desired angle to form convolutions 27. In the embodiment of tube forming machine 24 depicted in FIGS. 4 and 5, an arcuately curved camming ramp 41 is employed for receiving the incoming feed of thermoplastic profile 22 and guiding profile 22 onto rotating mandrel 30 in the desired angle to attain convolutions 27.

By referring to FIGS. 1, 2, and 4–6, along with the following detailed discussion, the construction and operation of one preferred embodiment of tube forming machine 24 can best be understood. In this preferred embodiment, tube forming machine 24 comprises support housing 45 which incorporates rotating cylindrical sleeve 46 mounted therein, constructed for continuously rotating about the central axis thereof. In addition, as best seen in FIG. 4, mandrel 30 is integrally interconnected with mounting plate 47, while camming ramp 41 is integrally interconnected with mounting plate 48. In order to provide the desired continuous rotational movement of mandrel 30 relative to stationary camming ramp 41, mounting plate 47 is securely affixed to rotating cylindrical sleeve 46. In addition, mounting plate 48 is fixedly secured to housing 45, thereby securely mounting camming ramp 41 to housing 45 in a stationary position while mandrel 30 is continuously rotated about its central axis due to the continuous rotation of cylindrical sleeve 46.

Tube forming machine 24 also preferably incorporates a support frame 50 mounted in association with rotating mandrel 30 and support housing 45. Although support frame 50 may be constructed in a variety of alternate embodiments, as depicted in the drawings, the purpose of support frame 50 is to be positioned for receiving hollow, cylindrical tube 28 as tube 28 is formed, and provide any support that may be required for holding tube 28 as tube 28 is formed and axially extends away from housing 45.

Although a wide variety of alternate constructions can be employed to assure continuous, guided, supporting control of hollow cylindrical tube 28, as tube 28 is formed by forming machine 24, the preferred components incorporated with support frame 50 include a plurality of rollers 51 which are specifically constructed for a desired diameter or adjustable to accommodate any desired diameter of tube 28. In the preferred construction, rollers 51 are mounted to frame 50 and positioned for contacting the outer surface of tube 28 as tube 28 is formed and axially extends outwardly from housing 45. By providing supporting rollers, the continuous rotational movement of tube 28, as well as its axial, longitudinal movement away from housing 45 is capable of being easily accommodated.

By employing the present invention, hollow cylindrical tube 28 may be formed in any desired diameter by merely altering the diameter of mandrel 30. By constructing mandrel 30 with an outer diameter substantially equivalent to the inside diameter desired for tube 28, the precisely desired inside diameter of tube 28 is attained. As a result, large diameter, hollow cylindrical tubes can be formed quickly and easily, without requiring the use of expensive, sophisticated, specially designed manufacturing equipment.

In addition to employing mandrels of varying diameters in order to attain the desired inside diameter tube dimension, both the thickness and outer diameter of tube 30 is controlled by forming profile 22 with the desired dimensions and thickness. Clearly, by forming profile 22 with the desired thickness as part of the extrusion process being performed by extruder 21, the desired thickness for tube 28 is attained. In addition, as is further detailed below, varying configurations and cross-sectional shapes are also produced by extruder 21 in order to attain specially constructed tube configurations.

In addition to producing hollow cylindrical tubes having any desired diameters and thicknesses, the present invention also produces hollow cylindrical tubes having any desired length. As detailed above, profile 22 is continuously received by tube forming machine 24 which continuously bonds the incoming profile 22 to the end of the previously received and bonded convolutions 27 which form tube 28. As a result, hollow cylindrical tube 28 continuously advances axially away from support housing 45 in a manner which allows the formed hollow cylindrical tube 28 to continuously increase in length until cut. In this way, any desired tube lengths can be accommodated easily and efficiently in a cost efficient manner.

In FIG. 1, one embodiment for cutting hollow cylindrical tube 28 to a desired length is depicted. In this embodiment, cutter assembly 54 incorporates a blade housing 55 within which endless cutting blade 56 is maintained and continuously rotated. Finally, in this embodiment, blade housing 55 is mounted to upstanding posts 57 mounted on opposed sides of frame assembly 50.

In employing this embodiment for a tube cutting system, when a desired length of tube 28 has been formed, blade housing 55 is advanced upwardly along support post 57, bringing cutting blade 56 into contact with at least the lower portion of tube 28. Since tube 28 continuously rotates about its central axis, the portion of hollow tube 28 contacting cutting blade 56 changes, thereby enabling cutting blade 56 to effectively cut tube 28 in its entirety to attain the desired length. As shown in FIG. 1, once the desired length of tube 28 is attained, it can be transported on a conveyor system to any desired location, enabling the next length of hollow cylindrical tube 28 to be formed and cut in a similar manner.

A further element that may be incorporated onto tube forming machine 24 if desired is an alignment roller 60, depicted in FIG. 6. If employed, alignment roller 60 is mounted to support housing 45 in direct association with the position where profile 22 is securely bonded to previously wound convolution 27. By employing alignment roller 60, which preferably comprises an overall length greater than the width of profile 22, assurance is provided that incoming profile 22 is bonded to the previously received convolution 27 in a substantially continuous, smooth, planar configuration. In this way, the outer surface of tube 28 is maintained with a substantially continuous, smooth, outer surface integrally formed therewith.

Figure 13:
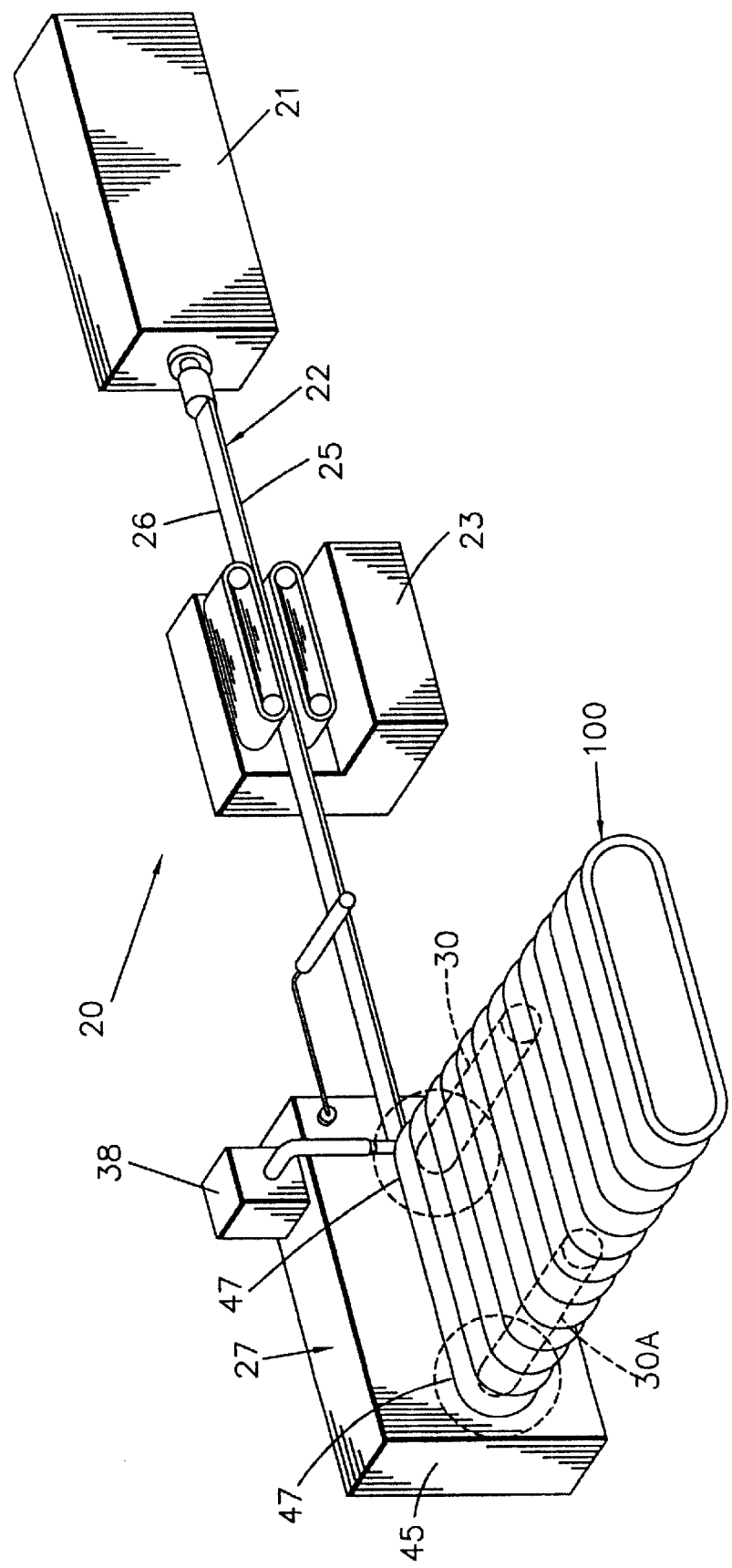
FIG. 13 is a perspective view of an alternate embodiment of the manufacturing equipment employed in producing enlarged spiral formed cylindrical tubes in accordance with the present invention.

By referring to FIG. 13, along with the following detailed disclosure, the construction and operation of another preferred embodiment of product forming system 20 of the present invention can best be understood. In this embodiment, as with the previous embodiment detailed above, product forming system 20 comprises extruder 21, which produces foam thermoplastic profile 22, in any desired configuration. As depicted, thermoplastic profile 22 has side edges 25 and 26 and is produced in a continuous length. In addition, puller 23 is preferably employed for continuously drawing foam thermoplastic profile 22 from extruder 21 and feeding the profile 22 to tube forming machine 24.

As with the embodiment detailed above, any desired thermoplastic material can be used to form profile 22. However, the preferred thermoplastic materials comprise one or more selected from the group consisting of polystyrenes, polyolefins, polyethylenes, polybutanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, and copolymers of polypropylene.

Figure 14:
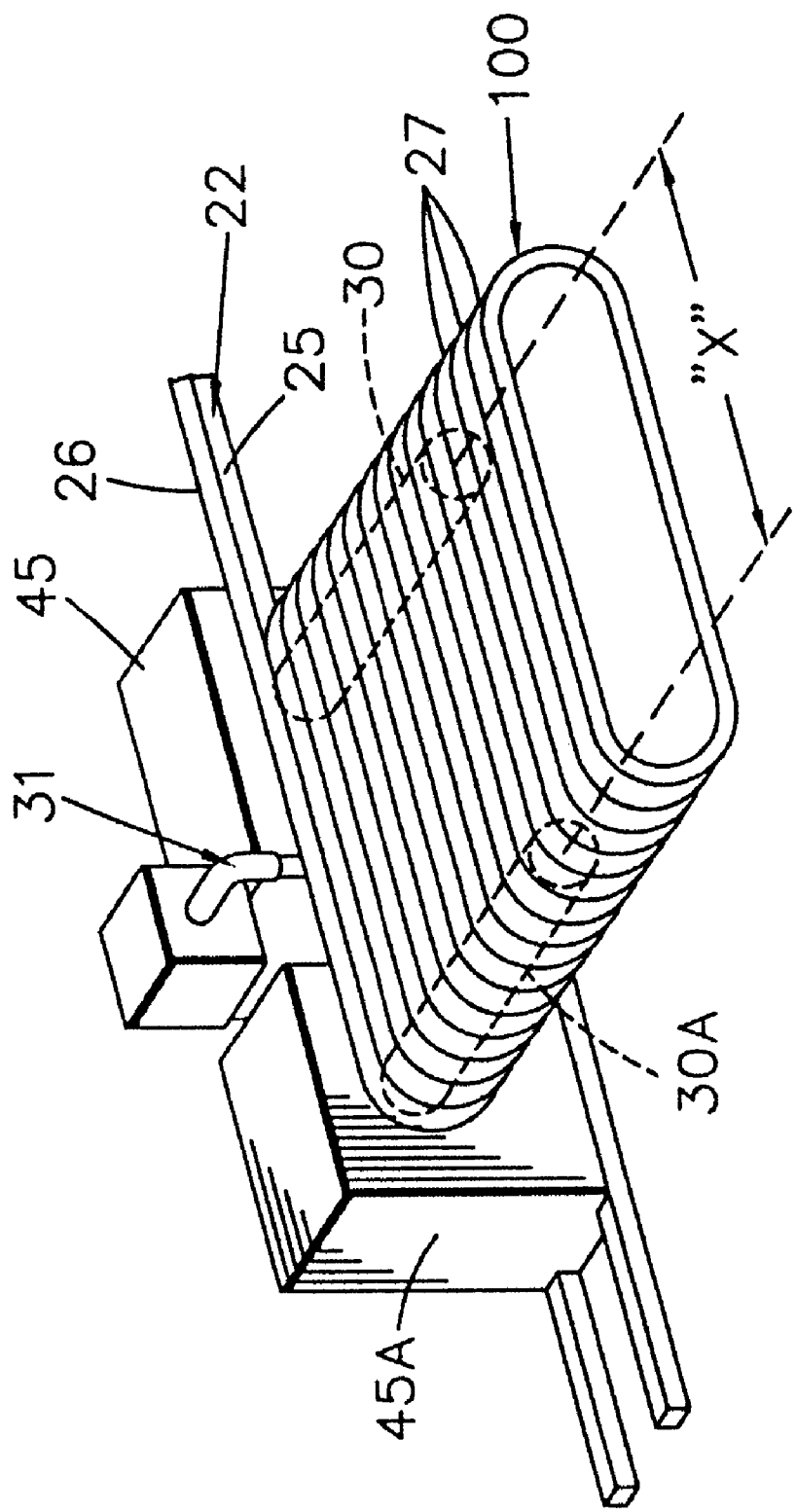
FIG. 14 is a rear side elevation view of a further alternate embodiment of the forming machine of the present invention incorporating two movable, separate and independent rotating mandrels depicted in one position.
Figure 15:
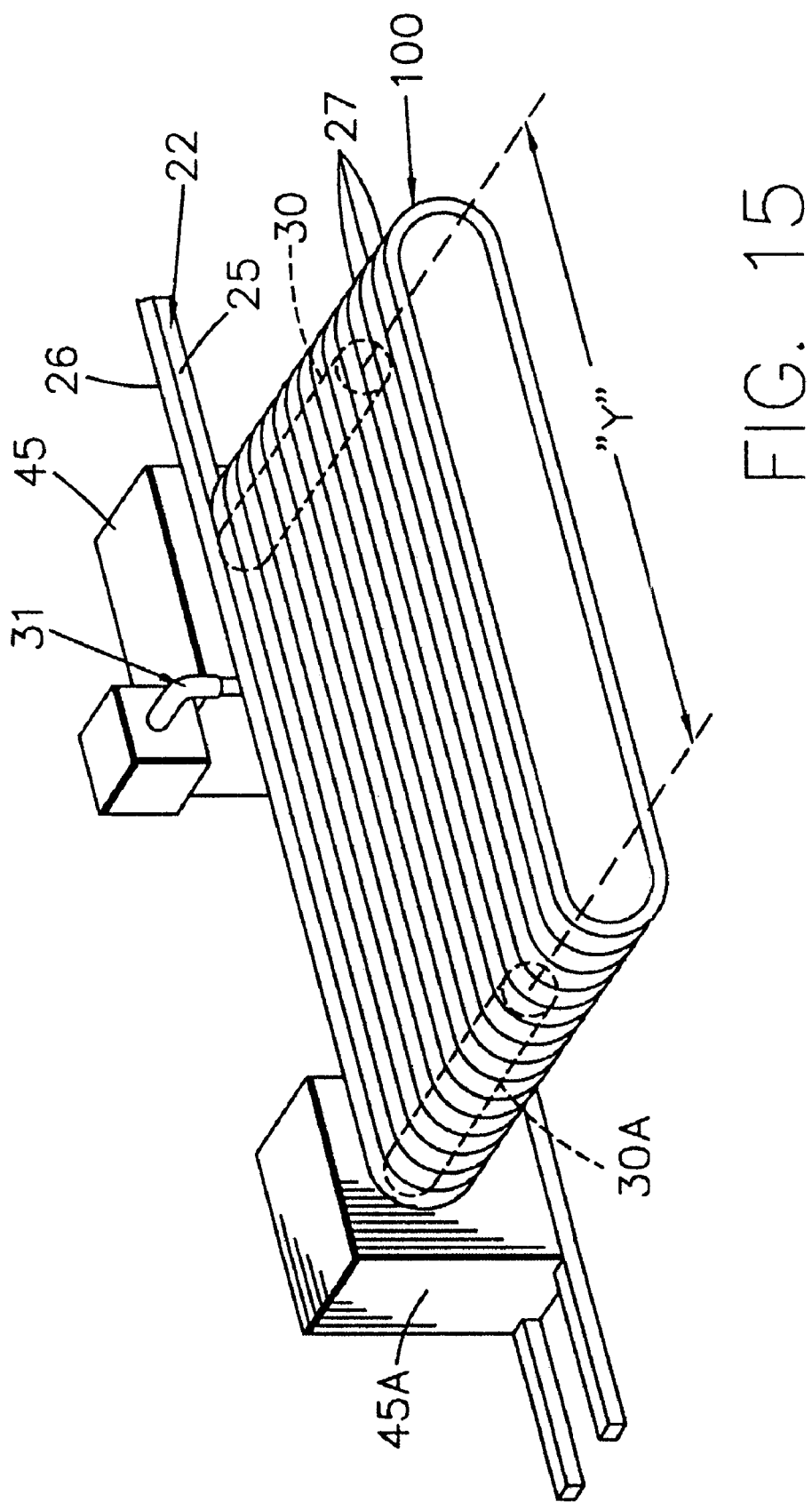
FIG. 15 is a rear side elevation view of the forming machine of FIG. 14 depicting the two movable, separate and independent rotating mandrels in a second position.

In order to best understand the construction and operation of this alternate preferred embodiment, reference should be made to FIGS. 13, 14, and 15, along with the following detailed discussion. By referring to these drawings and this detailed disclosure, a full and complete understanding of the unique aspects of this embodiment of the present invention can best be understood.

In this embodiment of the present invention, tube forming machine 24 comprises a plurality of separate and independent rotating sleeves or mandrels 30, each of which are mounted to support housing 45 of tube forming machine 24 for independent, continuous, rotational movement relative thereto. As is more fully detailed below, although any desired quantity of separate and independent rotating sleeves or mandrels 30 may be employed, it has been found that two rotating sleeves/mandrels are typically sufficient for producing most thermoplastic tube configurations desired. Furthermore, if desired, separate support housing 45 may be employed, positioned in juxtaposed, spaced relationship to each other.

As depicted in this embodiment, rotating sleeves/mandrels 30 and 30A are mounted to support housing 45 of tube forming machine 24 with the central axis of each sleeve/mandrel being parallel to each other. As a result, the two rotating sleeves/mandrels 30 and 30A cooperate with each other to form a single elongated, generally oval-shaped thermoplastic foam tube 100.

By spacing rotating sleeves/mandrels 30 and 30A with a sufficient distance between the central axis of each sleeve/mandrel, cylindrical foam tube 100 is capable of being easily produced with an overall diameter that is substantially greater than any diameter reasonably achievable using a single rotating sleeve/mandrel 30. In addition, by constructing rotating sleeves/mandrels 30 and 30A with a mounting plate 47, which is removably mountable to support housing 45 of tube forming machine 24, as detailed above, the diameter, size, and/or shape of sleeves/mandrels 30 and 30A can be altered to achieve any desired product configuration. As a result, virtually any desired product configuration is capable of being manufactured using this invention.

In the embodiment of the present invention depicted in FIG. 13, rotating sleeves/mandrels 30 and 30A are mounted to support housing 45 of tube forming machine 24 for cooperating rotation about fixed central axes. By employing this embodiment of the present invention, the major diameter of any oval-shaped cylindrical foam tube 100 produced thereon is substantially identical, with the shape and configuration varying only with the size and shape of the sleeves/mandrels 30 and 30A mounted to support housing 45.

In order to enable the manufacture of a substantially greater range of oval-shaped cylindrical foam tubes 100, with each product being manufactured with any desired major diameter sought by a customer, an alternate embodiment of the manufacturing equipment depicted in FIG. 13 has been achieved. In this embodiment, as depicted in FIGS. 14 and 15, sleeve/mandrel 30 is rotationally mounted to support housing 45 in a single, fixed location, while sleeve/mandrel 30A is rotationally mounted to support housing 45A which is constructed for longitudinal translational movement relative to sleeve/mandrel 30 and housing 45. As depicted, housing 45A and sleeve-mandrel 30A are movable along rails or tracks. However, any other desired method, such as rollers, casters, dollies, etc. may e employed with equal efficacy.

By employing this embodiment of the present invention, sleeves/mandrels 30 and 30A rotate about substantially parallel central axes, with the spaced distance between their respective central axes being virtually infinitely adjustable. As a result, oval shaped, cylindrical foam tubes 100 are capable of being produced with any desired major diameter. In this way, products previously incapable of being manufactured due to their size are now able to be easily achieved.

As shown in FIG. 14, the central axis of sleeve/mandrel 30A is spaced away from the central axis of sleeve/mandrel 30 a distance designated as "X". However, by longitudinally moving sleeve/mandrel 30A to an alternate spaced position, as shown in FIG. 15, the distance between the central axis of sleeve/mandrel 30A is spaced away from the central axis of sleeve/mandrel 30 a distance designated as "Y". In this Figure, distance "Y" is about three times greater than distance "X".

As is evident from this disclosure, any spaced distance can be achieved by merely placing sleeve/mandrel 30A in the desired location. Furthermore, by constructing this equipment in a manner which will accommodate a maximum major diameter, foam tube 100 can be produced in any desired size, configuration and/or shape.

Regardless of the embodiment employed for producing oval-shaped thermoplastic foam tubes using multiple sleeves/mandrels, a substantially similar production process is employed. In this process, tube forming machine 24 receives the foam thermoplastic profile 22 on continuously rotating sleeve/mandrel 30 in a manner which causes profile 22 to be supportingly contacted by the top surface of sleeve/mandrel 30. However, instead of wrapping about sleeve/mandrel 30, as detailed above in regard to the previous embodiment, profile 22 is advanced along a tangent line of sleeve/mandrel 30 and is transported to the top surface of rotating sleeve/mandrel 30A.

When profile 22 reaches the top surface of rotating sleeve/mandrel 30A, profile 22 is wrapped about sleeve/mandrel 30A from its top surface to its bottom surface. At the bottom surface of rotating sleeve/mandrel 30A, profile 22 is transported substantially along a tangent line thereof to the bottom surface of rotating sleeve/mandrel 30. At this position, profile 22 is wrapped about rotating sleeve/mandrel 30 in a manner which causes profile 22 to be advanced from the bottom surface to the top surface of sleeve/mandrel 30.

This process is continuously repeated to cause profile 22 to be repeatedly wrapped about both rotating sleeve/mandrels 30 and 30A, while extending between both sleeves/mandrels. In this way, a plurality of spirally wound convolutions 27 are formed in a side-to-side abutting relationship.

In addition, by employing this process, the incoming continuous feed of foamed thermoplastic profile 22 is automatically rotated about both sleeves/mandrels 30 and 30A in a spiral configuration which causes side edges 25 of incoming profile 22 to be brought into abutting contact with side edge 26 of the previously received and wrapped convolutions 27. By affixing or bonding abutting side edges 25 and 26 to each other at a desired juncture point, substantially cylindrical, oval-shaped, hollow foamed tube 100 is formed.

In order to provide integral, bonded, or affixed engagement of side edge 25 of profile 22 with side edge 26 of convolution 27, a bonding or fusion head 31 is employed. As detailed above, bonding/fusion head 31 may comprise a variety of alternate constructions which will produce the desired secure, affixed, bonded, interengagement of edge 25 with edge 26. In this embodiment, as with the embodiment detailed above, bonding/fusion head 31 preferably employs heated air.

As depicted, in this embodiment of the present invention, bonding/fusion head 31 is positioned between sleeve/ mandrel 30 and sleeve/mandrel 30A. However, if desired, bonding/fusion head 31 may be positioned directly above sleeve/mandrel 30 or may be positioned adjacent sleeve/mandrel 30. Regardless of the precise position employed for the placement of bonding/fusion head 31, secure affixation of side edges 25 and 26 is attained and elongated, oval-shaped, foam tube 100 is produced.

In this embodiment of the present invention, it has been found that bonding/fusion head 31 is preferably positioned in a location between sleeve/mandrel 30 and sleeve/mandrel 30A. In general, any location wherein the adjacent profiles being bonded are maintained in a substantially flat or planar position produces substantially enhanced results. In this regard, it has been found that the bonding or affixation of the adjacent profiles when the profiles are substantially flat eliminates an arcuate or curved set from being imparted into the tube during the formation process, as has been found with the use of a single sleeve/mandrel. In this way, large flat panels are more easily formed without requiring the reverse rolling techniques detailed in this disclosure.

The actual position employed for placing bonding/fusion head 31 between sleeve/mandrel 30 and sleeve/mandrel 30A may be varied by the user, depending upon the end product desired. In addition, any desired bonding/fusion system may be employed in order to attain the desired secure, affixed, bonded interengagement of the side edges of the foam profile.

In order to assure the production of foam tubes 100 in the precisely desired size, shape, and configuration, adjustable guide rails (not shown) may be incorporated as part of tube forming machine 24. By employing guide rails, foam profile 22 is supported during its passage from sleeve/mandrel 30 to sleeve/mandrel 30A. In this way, unwanted buckling, bending, or drooping of profile 22 is prevented as profile 22 advances between the two sleeves/mandrels.

In order to enable the guide rails to be usable regardless of the size, shape, or configuration of profile 22, the guide rails are preferably adjustable. In this way, assurance is provided that any configuration is easily accommodated. In addition, although guide rails have been found to be more important when a larger spaced distance exists between sleeve/mandrel 30 and sleeve/mandrel 30A, guide rails may be employed regardless of the spaced distance between sleeve/mandrel 30 and sleeve/mandrel 30A.

In order to provide additional control over the movement of profile 22 from sleeve/mandrel 30 to sleeve/mandrel 30A, rollers (not shown) are also preferably mounted in association with the guide rails. Furthermore, if desired, tension assemblies may also be employed in order to impart the desired level of tension or resistance to profile 22 as the profile is advanced from sleeve/mandrel 30 to sleeve/mandrel 30A. In this way, the precisely desired controlled movement of profile 22 is attained throughout the entire formation process of foam tube 100.

As discussed above, the use of the present invention can impart a curvature or arcuate set into the foam, cylindrical tube being produced. Depending upon the end product desired by the customer, the incorporation of an arcuate curve or set may be undesirable. Although the placement of the bonding/fusion head can reduce or eliminate this arcuate set, as detailed above, certain production arrangements may be incapable of enabling the bonding/fusion head to be positioned in the optimum location or may require final products with are completely flat or planer.

Figure 16:
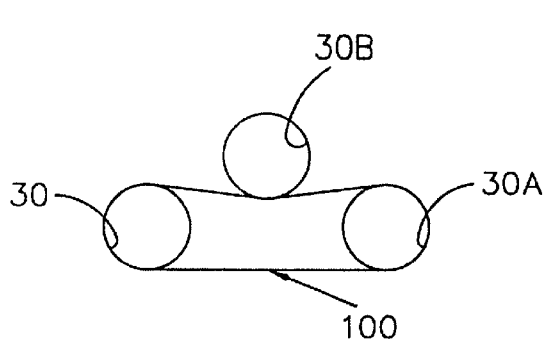
FIGS. 16–20 are diagrammatic side elevation views depicting alternate configurations for positioning a plurality of separate and independent rotating mandrels in accordance with the present invention.

In order to produce products meeting this more stringent requirement, a production system diagrammatically depicted in FIGS. 16 may be employed. In this production system, three separate and independent rotatable sleeves/mandrels are employed, with all three sleeve/mandrels having central axes which are substantially parallel to each other. In this construction, sleeves/mandrels 30 and 30A function in substantially the identical manner detailed above and are arranged with their central axes lying in a substantially horizontal plane. In addition, third sleeve/mandrel 30B is positioned between sleeves/mandrels 30 and 30A with the central axis thereof lying in a horizontal plane spaced above the horizontal plane of the axes of sleeve/mandrels 30 and 30A.

Furthermore, in the preferred construction of this embodiment of the present invention, sleeve/mandrel 30B is positioned in substantially equivalent juxtaposed, spaced relationship with sleeves/mandrels 30 and 30A, with the lower outer surface thereof in a horizontal plane which is below the horizontal plane formed by the top outer surfaces of sleeves/mandrels 30 and 30A. As a result, the outer surface of sleeve/mandrel 30B forces profile 22 and convolutions 27 to curve downwardly in order to pass around sleeve/mandrels 30B as the profiles pass from sleeve/mandrel 30 to sleeve mandrel 30A. As a result, this configuration of the present invention causes a reverse set or reverse curvature to be continuously imparted into the elongated, oval-shaped foam tube 100 being formed. In this way, any natural curvature or set normally imparted into oval-shaped foam tube 100 by the formation process is automatically eliminated by employing sleeve/mandrel 30B to impart a reverse curvature to foam tube 100.

In FIGS. 17–20, alternate arrangements for employing the present invention using a plurality of sleeve/mandrels 30 are depicted. These alternate embodiments are provided as examples of alternate configurations that can be employed for producing a greatly enlarged, continuous, thermoplastic foam tube member 100 in a confined or small production area. As depicted, by employing a plurality of rotatable sleeves/mandrels 30 which are positioned in various stacked configurations, a greatly enlarged thermoplastic foam tube member 100 is capable of being produced in a limited or confined space.

As shown in these figures, representative samples of various production systems are depicted using three to nine separate and independent rotating sleeves/mandrels 30. In each system, rotating sleeves/mandrels 30 are mounted to a support housing (not shown) which is part of the tube forming machine. However, for diagrammatic purposes, only the sleeves/mandrels 30 and foam tube member 100 are depicted in these figures.

Figure 17:
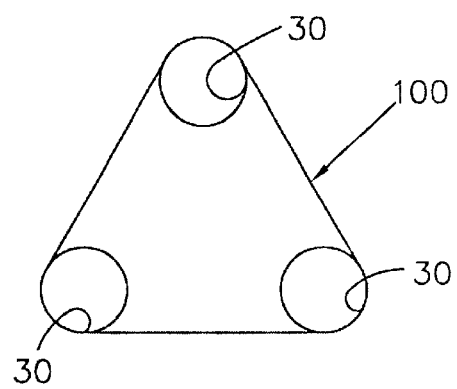
Figure 18:
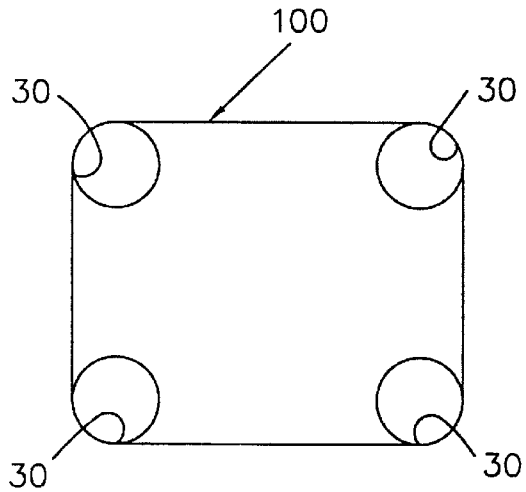
Figure 19:
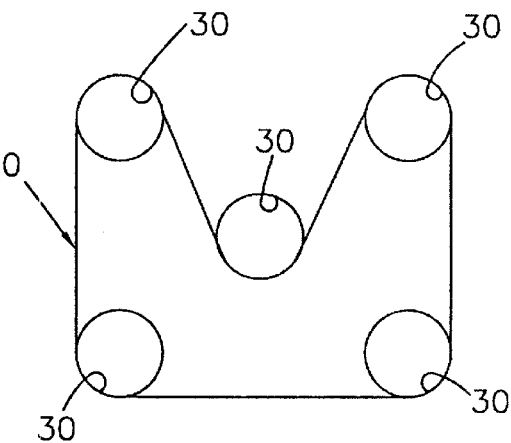

In FIG. 17, three rotatable sleeves/mandrels 30 are arranged in a triangular configuration, while FIG. 18 depicts four sleeves/mandrels 30 arranged in a square or rectangular shape. In FIG. 19, five separate and independent rotatable sleeves/mandrels 30 are depicted, arranged in a configuration which is capable of imparting a reverse curve into foam tube member 100 being produced thereby. In this embodiment, as well as in any of the other embodiments shown herein, one of the rotatable sleeves/mandrels 30 may incorporate heating means in order to further enhance the effect of the reverse curve construction.

Figure 20:
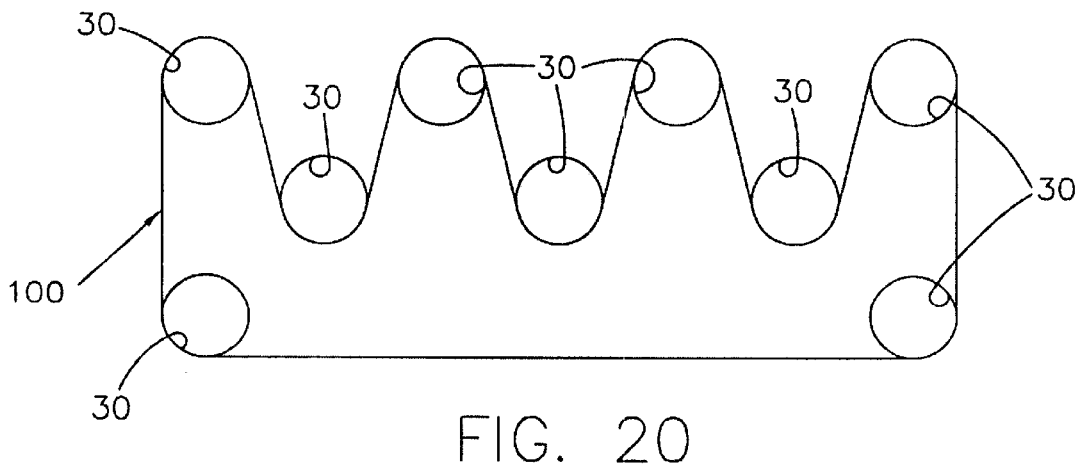

Finally, FIG. 20 depicts a production system incorporating nine separate and independent rotatable sleeves/mandrels 30, which all cooperate to form a single, continuous, hollow, substantially cylindrically shaped foam tube member 100. As is evident from the configuration depicted in FIG. 20, a greatly enlarged tube member 100 is achievable using a construction of this nature, in a substantially reduced production area.

As detailed above, product forming system 20 of the present invention enables the efficient production of hollow cylindrical tubes 28 with virtually any desired diameter and wall thickness, without requiring the use of costly, specially designed manufacturing equipment. As a result, a substantial advance in the formation of large diameter cylindrical tubes is attained.

In addition to the substantial advance and unique discovery in the production of large diameter, hollow cylindrical foam tubes, the present invention also achieves the equally efficient production of large width planks or sheets of thermoplastic foam material in virtually any desired thickness. As shown in FIG. 7, a substantially flat plank or sheet of the foam thermoplastic material is easily attained from the formed hollow cylindrical tube by employing cutter means 65.

In order to attain a substantially flat sheet or plank of foam thermoplastic material 70, cutter means 65 with circular cutting blade 66 is mounted and supported in the generally conventional manner for longitudinally cutting through the wall of hollow cylindrical tube 28. As tube 28 is longitudinally cut in the manner depicted in FIG. 7, the thermoplastic material forming tube 28 is allowed to spread outwardly, forming a substantially flat plank or sheet 70 of thermoplastic material. If the length of tube 28 does not correspond to the length desired for sheet/plank 70, sheet/plank 70 is merely cut to the desired length to obtain sheet/plank 70 depicted in FIG. 8.

As is apparent from the preceding disclosure, sheet/plank 70 is constructed with any desired width by merely forming hollow cylindrical tube 28 with a diameter, or circumference, which will produce the desired width when tube 28 is longitudinally split and formed into sheet/plank 70. In addition, any desired thickness sought for sheet/plank 70 is easily achieved by forming profile 22 with the precisely desired thickness. As a result, by employing the present invention, sheet/plank 70 is constructed in any width and thickness in a single production step, thereby eliminating the necessity for using expensive, specially designed manufacturing equipment as well as employing numerous repetitive steps required for constructing products having a thickness greater than ½".

The transition or transformation of the thermoplastic material from hollow cylindrical tube 28 to substantially flat, planar, sheet/plank 70 depends upon the temperature of the profile 22 during the formation of tube 28 as well as the temperature of the plastic material when tube 28 is longitudinally cut. In the preferred operation, cylindrical tube 28 is formed using a heated profile 22, and tube 28 is cut while the thermoplastic foam material retains sufficient heat from the extrusion process. In this way, sheet/plank 70 is formed automatically or easily formed by merely placing the sheet/plank 70 in a flat configuration and allowing sheet/plank 70 to cool in that configuration.

Figure 7A:
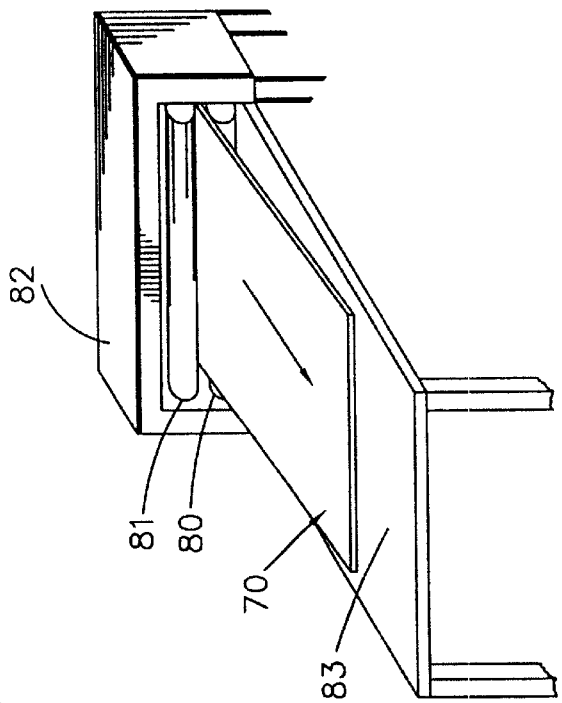
FIG. 7A is a perspective view of a roller system.
Figure 7:
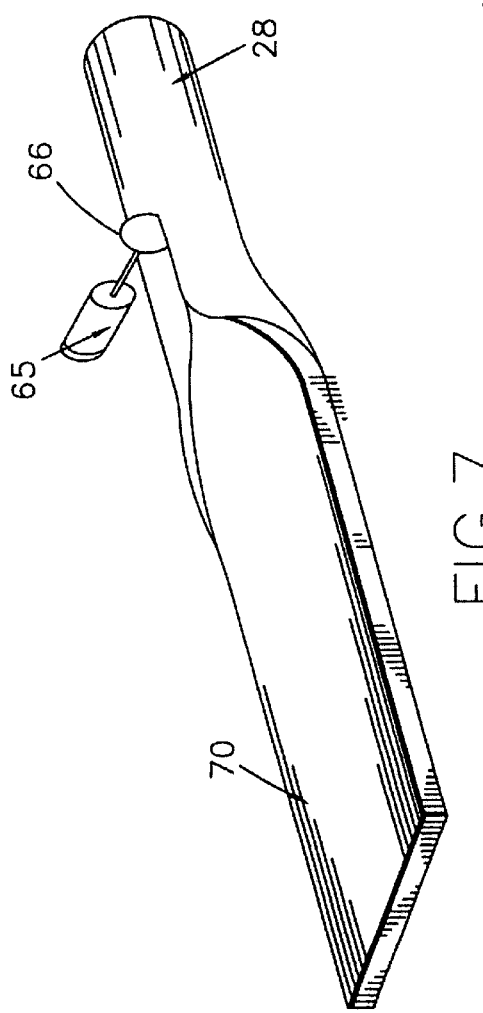
FIG. 7 is a perspective view of a hollow cylindrical tube member formed in accordance with the present invention in the process of being slit to form a substantially flat sheet or plank.
Figure 8:
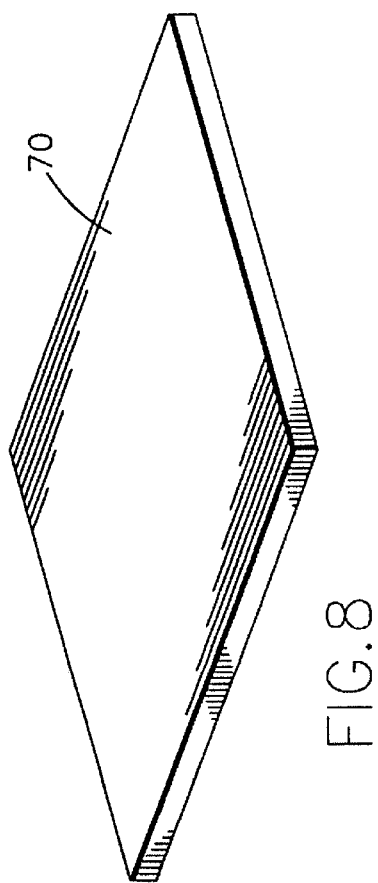
FIG. 8 is a perspective view of a substantially flat thermoplastic foam sheet or plank formed in accordance with the present invention.

If desired, a roller system as depicted in FIG. 7A may be employed. As shown therein, rollers 80 and 81 are mounted in housing 82 and are interconnected with drive means (not shown) which are connected to rotational drive rollers 80 and 81 in opposite directions. In the preferred constructions, rollers 80 and 81 are rotationally driven to enable sheet/plank 70 to be received by rollers 80 and 81 and automatically advanced between the rollers by the rotational movement thereof. In addition, sheet/plank 70 is advanced away from rollers 80 and 81 by the action of roller 80 with support table 83, after being wrapped about roller 80.

In those instances in which sheet/plank 70 incorporates a residual curved shape due to its formation from a cylindrical shaped tube, the roller system depicted in FIG. 13 may be employed in order to eliminate the residual curve. By feeding the sheet/plank 70 between rollers 70 and 81 and causing sheet/plank 70 to be wrapped about roller and emerge from roller 80 on table 83, the residual curve incorporated into sheet/plank 70 is eliminated by counteracting this residual curve with the curved wrapping of sheet/plank 70 about roller 80. By employing this roller system, any residual curve in sheet/plank 70 is quickly and easily eliminated, producing sheet/plank 70 with any desired dimensions in the precisely desired flat configuration.

In alternate production situations, namely where tube 28 is formed using heated profile 22 but allowed to cool prior to cutting or in situations where profile 22 has cooled prior to the formation tube 28, some residual curvature may remain after tube 28 has been longitudinally slit. However, in any such situation, the curved sheet or plank is merely placed in a heated chamber in a manner which enables sheet/plank 70 to be formed into a substantially flat configuration. Once sheet/plank 70 has been formed into a substantially flat, planar configuration, sheet/plank 70 retains the flat configuration after cooling.

By employing this process, which is typically referred to as thermoforming, sheet/plank 70 may be formed into any desired cross-sectional configuration. As a result, if so desired, sheet 70 can be formed into any desired shape, such as a rectangle and placed in a heated chamber. Once sufficiently heated, the foamed thermoplastic material is removed from the heated chamber and allowed to cool in the newly formed shape. Once cooled, the thermoplastic material remains in the new configuration until reheated and placed in a new configuration.

Many foam products are formed with a plurality of separate and distinct layers in order to attain a final product that is capable of satisfying specific conditions required by the user. Examples of such products include hollow cylindrical foam tubes laminated with an external jacket for durability or weather protection; foam tubes incorporating an elongated longitudinal slit in combination with pressure sensitive adhesive for closing the slit after installation; foam tubes laminated with an internal jacket for elevated temperature protection or moisture protection; foam sheets laminated with specialty adhesives and/or protective liners; foam sheets or profiles laminated with materials of different colors; and foam tubes coextruded with dissimilar materials, such as wiring, in order to enhance structural properties.

Although prior art conventional production techniques are capable of efficiently producing foam profiles and sheets having multiple layers for such purposes, as detailed above, the capability of producing similar products in tube form with large diameters is extremely costly. Similarly, the production of thermoplastic material in large sheets with a plurality of layers is also extremely difficult and costly to produce. However, by employing the present invention, these prior art difficulties and inabilities are eliminated and a highly competitive, cost efficient, sophisticated production system is attained for producing multilayer hollow cylindrical tubes and sheets or planks in flat form or any desired shape or configuration.

Figure 9:
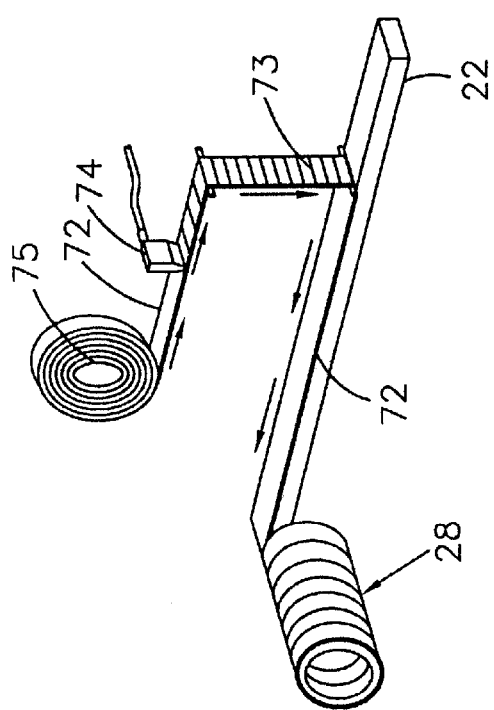
FIG. 9 is a perspective view diagrammatically depicting the formation of a hollow cylindrical tube in accordance with the process of the present invention wherein a second layer of material is affixed to the extruded foamed layer prior to formation of the cylindrical tube.

By referring to FIG. 9, one method for applying a second layer to profile 22 is diagrammatically depicted. In this embodiment, although not shown, tube 28 is produced using tube forming machine 24 detailed above. In this exemplary process, second layer 72 is securely affixed to thermoplastic foam profile 22 by adhesive means 73. As depicted, adhesive applying head 74 is positioned in cooperating relationship with second layer 72 applying adhesive 73 to one surface thereof as layer 72 is withdrawn from layer roll 75.

As adhesive means 73 is applied to one surface of layer 72, the adhesive bearing layer is applied directly to one surface of profile 22, securely bonding and affixing layer 72 to profile 22. As is apparent to one of ordinary skill in the art, a plurality of alternate construction methods and layers may be employed for affixing a second layer 72 to profile 22. The method shown in FIG. 9 is employed merely for exemplary purposes only and is not intended in any way to limit the present invention, since numerous alternate methods can be used without departing from the scope of this invention.

Once layer 72 is securely affixed to profile 22, the dual layer component is advanced onto tube forming machine 24 in a manner detailed above in order to form hollow cylindrically shaped tube 28 incorporating a foamed inner core with an outer surface comprising second layer 72.

Figure 10:
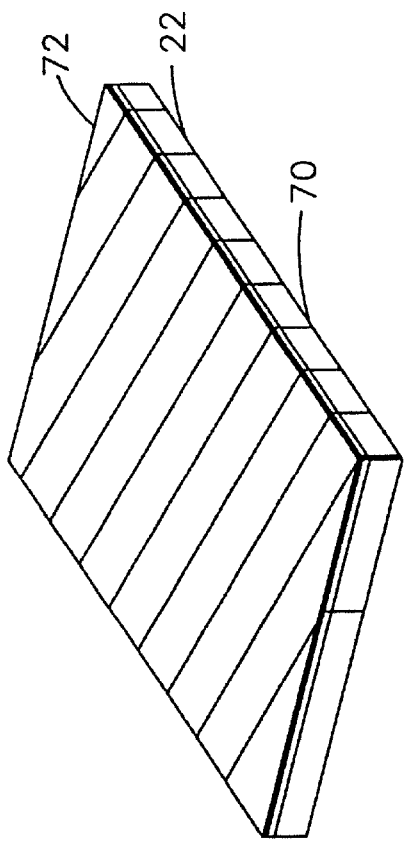
FIG. 10 is a perspective view depicting an enlarged plank or sheet of foam plastic material formed with a second layer affixed thereto.

In FIG. 10, the dual layer material produced in FIG. 9 is depicted as a substantially flat sheet or plank 70. Since the dual layer material is employed as the source material, plank or sheet 70 of FIG. 10 comprises layer 72 intimately bonded to the thermoplastic material comprising profile 22.

Figure 11:
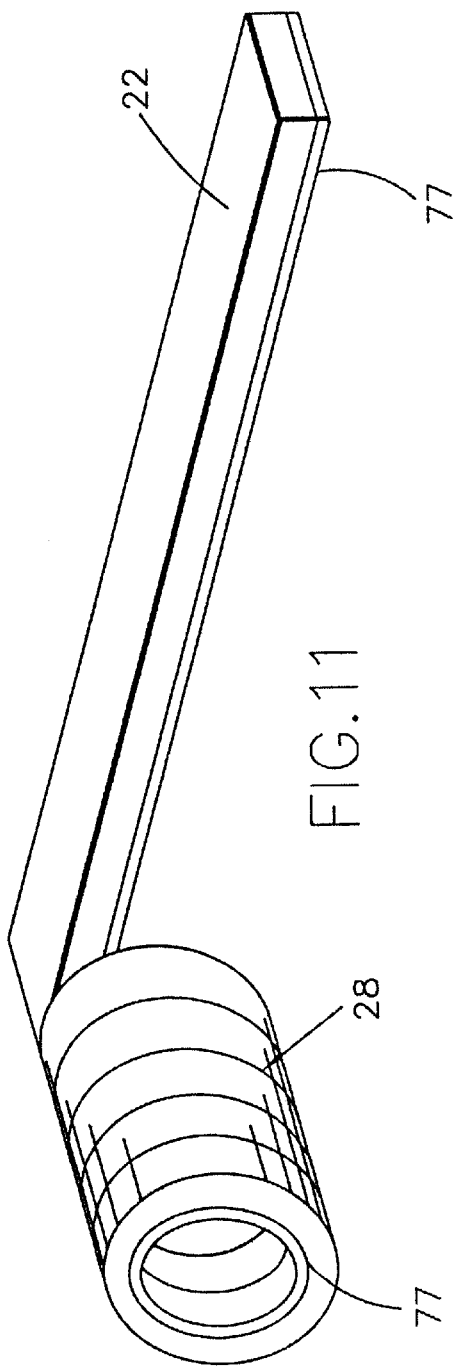
FIG. 11 is a perspective view of a hollow cylindrical tube depicted diagrammatically employing the present invention for forming a dual layer hollow cylindrical member.

In FIG. 11, an alternate construction is diagrammatically depicted for forming a dual layer hollow cylindrical layer 28. In this embodiment, layer 77 of the desired material is securely affixed to the bottom of profile 22 in order to produce hollow cylindrical tube 28 having an inner core comprising layer 77 of the desired material.

As detailed above, this embodiment of tube 28 is formed in the identical manner using tube forming machine 24. By employing this construction, a higher temperature insulation material can be employed for layer 77, thereby providing a cost effective hollow cylindrical tube 28 capable of resisting high temperature in applications where such requirement is necessary. Furthermore, employing this invention, tube 28 can be constructed with this dual layer configuration to attain a tube having any desired diameter and thickness required for a particular application.

In addition to forming hollow cylindrical tube 28 in the manner detailed above as either a single layer of foam thermoplastic material or as a multi-layer product incorporating additional layers of material bonded thereto, both the cylindrical tube and the substantially flat sheet or plank produced by the present invention may be formed in a wide variety of alternate shapes or configurations. In this way, any desired configuration sought for an end product can be attained using the present invention.

Figure 12:
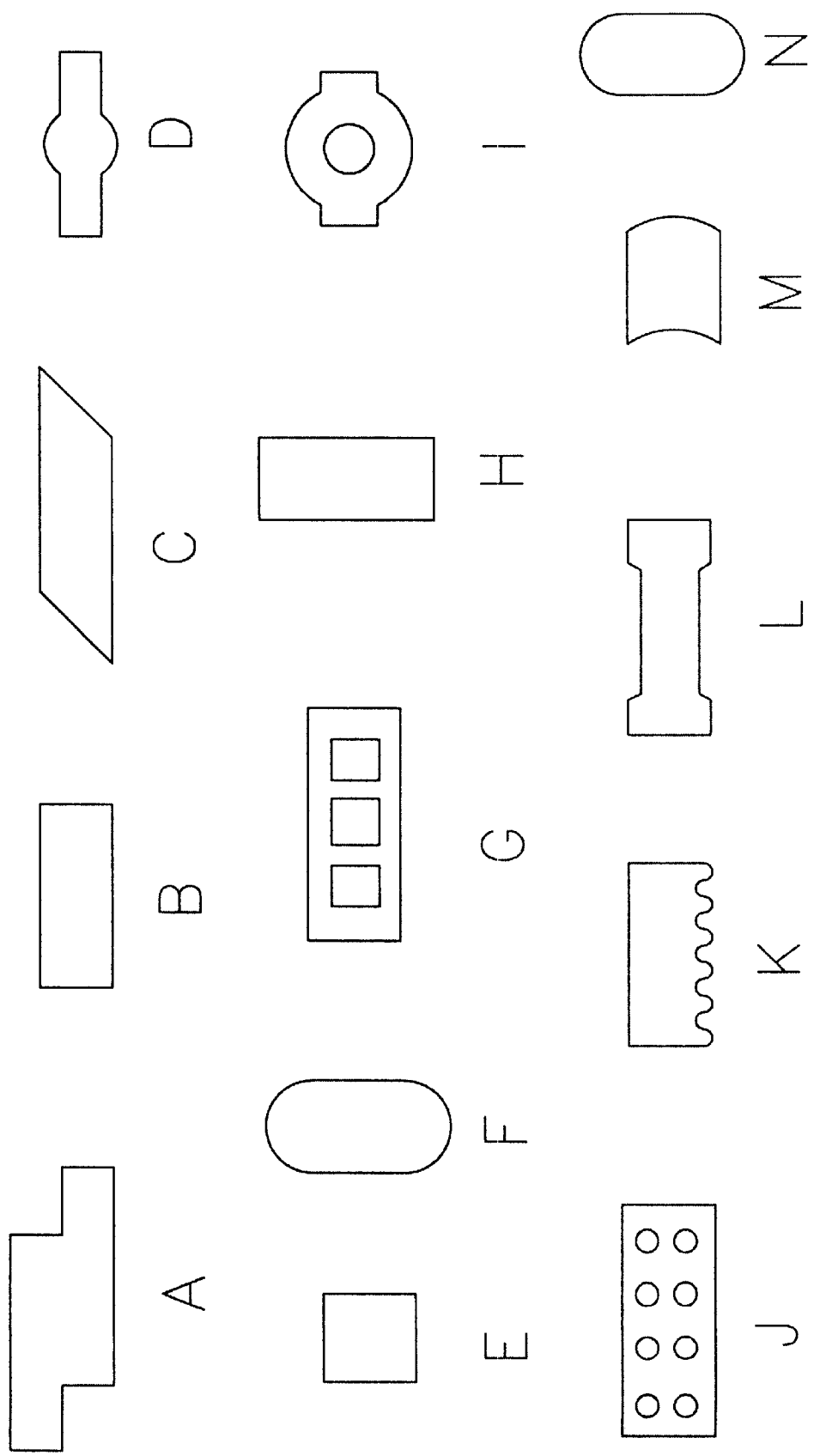
FIG. 12 is a series of fourteen cross-sectional views of alternate configurations of the extruded thermoplastic foam profile.

In FIG. 12, various alternate exemplary shapes are provided representing the cross-sectional shape producible by extrusion machine 21 depicted in FIG. 1. Although these alternate shapes are not exhaustive of the wide variety of cross-sectional configurations and internal cavities capable of being produced using conventional extrusion equipment, the shapes are provided as an example of the various configurations that may be attained. In addition, by employing the present invention, bonded interengagement of the side edges of the adjacent profiles as wound around mandrel 30 enables the wide variety of end product configurations to be attained.

For example, the cross-section depicted in cross-section "A" of FIG. 12 represents an overlying lapped edge for producing a hollow cylindrical tube having an overlapping lapped edge configuration bonding each adjacent convolution thereof. In addition, if desired, a substantially flat sheet or plank can also be produced from the hollow cylindrical tube formed from profile represented by cross-section "A" of FIG. 12.

Cross-sections "G", "I", and "J" are examples of profiles producible with internal cavities. These cross-sectional shapes are merely examples of the wide variety of cross-sectional configurations that can be produced, including the number, position, and shape of the internal cavity. However, cross-sectional profiles of this general configuration are of particular importance in producing substantially flat sheets or planks incorporating longitudinally extending internal cavities.

In order to produce a final product of this nature, a hollow cylindrical tube is produced and longitudinally cut as detailed above. However, in order to assure a longitudinally extending, substantially continuous open zone through the entire sheet or panel, the resulting panel/sheet product would be cut or trimmed at the appropriate angle in order to attain a final configuration wherein each of the profiles forming the sheet or panel are parallel with the side edge, thereby enabling the internal cavity contained therein to be longitudinally extending through the entire sheet or panel. In this way, various products, such as cushioning mats, protectors, liners, floats, etc. are all producible in a highly effective, cost efficient manner.

As is apparent from the foregoing detailed disclosure, the present invention attains a unique manufacturing process, production equipment, and product configurations which have previously been unattainable without requiring the use of expensive production equipment and costly manufacturing steps. However, using the process and equipment detailed herein, products are now produced which have previously been unattainable using prior art technologies. Consequently, although certain examples have been provided as a disclosure of the present invention, it is understood that these examples are merely to teach the overall invention and are not intended to limit the present invention.

It will thus be seen that the objects set forth above, among those made apparent from the preceding description are efficiently attained and, since certain changes may be made in carrying out the above process, and the construction of the equipment detailed above, as well as the resulting produce herein described, without departing from the scope of the invention, it is intended that all matter contained in the above description or shown in the accompanying drawings shall be interpreted as illustrative and not in a limiting sense.

What is claimed is:

1. A method for manufacturing foam thermoplastic products comprising the steps of:

A. continuously extruding a foam thermoplastic member in an elongated, longitudinally extending, substantially continuous length having a desired cross-sectional shape, using a fixed immovable extruder;

B. advancing the elongated, longitudinally extending foam thermoplastic member into association with a puller member constructed for continuously drawing the foam thermoplastic member from the extruder and feeding the foam thermoplastic member to forming means, having a fixed base and at least two separate and independent rotatable mandrels mounted thereto, each of said mandrels comprising a single, longitudinally extending, substantially continuous surface having a substantially uniform cross section throughout its length;

C. controllably winding the elongated, longitudinally extending, foam thermoplastic member directly on said rotatable mandrels of said forming means in a manner to cause opposed sides of the foam thermoplastic member to be positioned in a side-to-side, adjacent relationship when wound on said rotatable mandrels;

D. continuously bonding/joining the adjacent side edges of the foam thermoplastic member to each other as the foam member is wound on the rotatable mandrels;

E. continuously forming a foam thermoplastic member which
   a. continuously advances longitudinally along the length of the rotatable mandrel; and
   b. continuously advances beyond a terminating end of the mandrel; and F. repeatedly cutting desired lengths of the foam thermoplastic member from the length thereof extending beyond the terminating end of the rotatable mandrel;

thereby providing hollow foam thermoplastic products having any desired size or shape.

2. The method defined in claim 1, wherein said foam thermoplastic member comprises at least one selected from the group consisting of polystyrenes, polyolefins, polyethylenes, poly-butanes, polybutylenes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, and copolymers of polypropylene.

3. The method defined in claim 1, wherein the cross-sectional shape of the foam thermoplastic member comprises one selected from the group consisting of rectangles, squares, parallelograms, polygons, ellipses, circles, ovals, cones, and combinations thereof.

4. The method defined in claim 3, wherein a cross-section of the thermoplastic member is further defined as being solid.

5. The method defined in claim 3, wherein a cross-section of the foam thermoplastic member is further defined as comprising at least one aperture longitudinally extending through substantially the entire length thereof.

6. The method defined in claim 1, wherein each of the rotatable mandrels of the forming means comprises a support surface constructed for receiving and controllably winding the elongated longitudinally extending, substantially continuous foam thermoplastic member and for controllably causing a first side surface of the elongated foam thermoplastic member to be brought into side-to-side relationship with a second side surface thereof.

7. The method defined in claim 6, wherein each of the rotatable mandrels:
   A. comprises a substantially uniform cross-sectional shape having a desired geometry which extends throughout the length thereof,
   B. is constructed for rotation about a central axis, and
   C. is positioned for receiving the elongated, longitudinally extending, substantially continuous foam thermoplastic member and enabling the elongated foam thermoplastic member to be continuously wrapped about at least a portion of the surface thereof, thereby producing an elongated foam product peripherally surrounding and supportingly maintained thereon.

8. The method defined in claim 7, wherein the at least two cooperating rotatable mandrels employed are each positioned in juxtaposed, spaced, cooperating relationship with each other for receiving the foam thermoplastic member and enabling the foam thermoplastic member to extend about each rotatable mandrel in a continuous loop.

9. The method defined in claim 8, wherein each of said rotatable mandrels comprises a substantially cylindrical shape with the central axis of each rotatable mandrel being parallel to each other and said foam thermoplastic member is wrapped about a portion of each of said cylindrically shaped rotatable mandrels, continuously extending from one of said rotatable mandrels to another rotatable mandrel in a continuous loop.

10. The method defined in claim 9, wherein at least two of said rotatable mandrels are positioned with their respective central axes lying in the same horizontal plane and the outer surfaces thereof also define a single horizontal plane.

11. The method defined in claim 10, wherein at least three separate and independent rotatable mandrels are employed with the outer surface of one of said rotatable mandrels lying in a plane intersecting the plane defined by said at least two rotatable member.

12. The method defined in claim 10, wherein a plurality of separate and independent rotatable mandrels are employed to create a substantially enlarged, cylindrically shaped, hollow foam thermoplastic product using a minimum of floor space.

13. The method defined in claim 7, wherein each of said rotatable mandrels is further defined as comprising a circular shape and is removably mounted to a rotating holding member for enabling rotatable mandrels of different diameters to be employed.

14. The method defined in claim 7, wherein at least one of said rotatable mandrels is further defined as comprising guide means formed thereon for receiving the elongated, longitudinally extending, continuous foam thermoplastic member and controllably advancing the foam thermoplastic member about the outer surface of the rotatable mandrel in a generally spiral configuration, whereby the side surfaces of the thermoplastic member are brought into contacting relationship with each other.

15. The method defined in claim 14, wherein said bonding/joining step is performed by heating the side surfaces of the elongated, longitudinally extending foam thermoplastic member as the side surfaces thereof are brought into contacting relationship with each other.

16. The method defined in claim 14, wherein the bonding step is performed by applying adhesive means to one side surface of the foam thermoplastic member for causing secure bonding engagement when opposed side surfaces contact each other.

17. The method defined in claim 1, further comprising the step of
   E. cutting the formed hollow foam thermoplastic product in a plane substantially perpendicular to the central axis thereof, thereby providing hollow foam thermoplastic products in a precisely desired length.

18. The method defined in claim 17, and further comprising
   F. supporting the hollow foam thermoplastic product as the product is produced, thereby preventing unwanted distortions of the product.

19. The method defined in claim 17, and further comprising the steps of
   F. longitudinally cutting the hollow foam thermoplastic product along one wall of the formed thermoplastic product after said diametric cutting step has been performed; and
   G. opening said longitudinally cut thermoplastic product into a substantially flat plank member having any desired length and width thereby forming a plank member with any desired dimensions.

20. The method defined in claim 19, and further comprising the step of:
   H. passing the open plank member through roller means for removing any curvature retained therein from the forming process.

21. The method defined in claim 19, and further comprising the steps of:
   H. placing the open plank member in a heated chamber and allowing the plank to be heated until flat; and
   I. cooling the plank in a flat configuration.

22. The method defined in claim 1 and further comprising the steps of:
   G. applying at least one additional layer of material to a surface of the foam thermoplastic member prior to passage thereof to the forming machine; and
   H. bonding said additional layer to the surface of the foam thermoplastic member, whereby a multi-layer hollow product is produced having any desired size and shape.

23. The method defined in claim 22, wherein said bonding step is performed by employing at least one selected from the group consisting of adhesives and heat.

24. A system for manufacturing hollow, substantially cylindrically shaped, elongated foam thermoplastic members in a continuous production operation, said system comprising
   A. a fixed, immovable extruder for continuously producing elongated, substantially continuous lengths of a foam thermoplastic member having the desired cross-sectional shape;
   B. a puller member positioned between the extruder and a forming machine and constructed for drawing the foam member from the extruder and feeding the foam member to the forming machine;
   C. a forming machine comprising a fixed, immovable base and at least two separate and independent, longitudinally extending substantially continuous rotatable support surfaces positioned for receiving the elongated, continuous foam thermoplastic member directly from the pulley member and continuously winding the thermoplastic member in direct association with the support surfaces, whereby a first side surface of the thermoplastic member is brought into alignment with a second side surface thereof;
   D. bonding/joining means positioned in direct association with the rotatable support surfaces and the forming machine and in cooperating relationship with the foam thermoplastic member for bonding the side surfaces of the elongated foam thermoplastic member as the side surfaces are brought into contact with each other, causing the surfaces to be securely affixed together;
   whereby an elongated, hollow shaped foam thermoplastic member is produced having any desired length and any desired hollow shape.

25. The system defined in claim 24, wherein the bonding means is further defined as comprising heating means positioned in cooperating relationship with the forming machine in cooperating relationship with the foam thermoplastic member as the side surfaces thereof are brought into juxtaposed alignment with each other, said heating means being formed from one or more selected group consisting of hot air delivery means and heated surfaces.

26. The system defined in claim 24, wherein said bonding means is further defined as comprising adhesive means.

27. The system defined in claim 24, wherein the support surfaces of the forming machine are defined as comprising a cylindrical shape for producing elongated foam members having hollow cylindrical shapes, with said cylindrically shaped member being mounted for continuous rotation about its central axis, thereby enabling the foam thermoplastic member to be continuously wound therein.

28. The system defined in claim 27, wherein said system further comprises cam means mounted to the support surfaces of the forming machine for receiving the elongated foam thermoplastic member from the extruder and guidingly advancing the foam thermoplastic member onto the cylindrically shaped rotating support surfaces and enabling the first side surface of the foam thermoplastic member to be brought into juxtaposed spaced, aligned relationship with the second side surface thereof.

29. The system defined in claim 24, wherein said system further comprises cutting means for longitudinally slicing the hollow shaped, foam thermoplastic member through at least one wall thereof, thereby producing a substantially flat foam thermoplastic panel.

30. The system defined in claim 24, wherein said system further comprises roller means cooperatively associated with the forming machine for aligning at least one surface of the incoming foam thermoplastic member with the corresponding surface of the previously wound thermoplastic member.

31. The system defined in claim 24, wherein the elongated foam thermoplastic member is further defined as having a cross-sectional shape comprising one selected from the group consisting of rectangles, squares, parallelograms, polygons, ellipses, circles, ovals, cones and combinations thereof.

32. The system defined in claim 24, wherein said foam thermoplastic member comprises one selected from the group consisting of polystyrene, polyolefins, polyethylenes, polybutanes, polyurethanes, thermoplastic elastomers, thermoplastic polyesters, thermoplastic polyurethanes, polyesters, ethylene acrylic copolymers, ethylene-vinyl-acetate copolymers, ethylene-methyl acrylate copolymers, ethylene-butyl-acrylate copolymers, ionomers, polypropylene's and polypropylene.

33. The system defined in claim 24, each of said support surfaces:
   A. comprising a substantially uniform cross-sectional shape having a desired geometry which extends throughout the length thereof,
   B. is constructed for rotation about a central axis, and
   C. is positioned for receiving the elongated, substantially continuous foam thermoplastic member and enabling the elongated foam thermoplastic member to be continuously wrapped about the surfaces thereof.

34. The system defined in claim 33, wherein the central axes of the rotatable support surfaces are parallel to each other and the foam thermoplastic member extends about a portion of each rotatable member in a continuous loop.

35. The system defined in claim 34, wherein the central axis of at least two of said rotatable support surfaces lies in a single horizontal plane.

36. A system for manufacturing hollow, substantially cylindrically shaped, elongated foam thermoplastic members in a continuous production operation, said system comprising
   A. a fixed, immovable extruder for continuously producing elongated, substantially continuous lengths of a foam thermoplastic member having the desired cross-sectional shape;
   B. a puller member positioned between the extruder and a forming machine and constructed for drawing the foam member to the forming machine;

C. a forming machine comprising at least two separate and independent, cooperating rotatable support members for receiving the elongated, continuous foam thermoplastic member from the extruder and enabling the continuous winding of the thermoplastic member in direct association with the support members, each of said support members comprising a substantially cylindrical shape with a central axis which is substantially parallel to the central axis of the cooperating support members, whereby a first side surface of the thermoplastic member is brought into alignment with a second side surface thereof as the foam thermoplastic member is wrapped about a portion of each cylindrically shaped rotatable support member, continuously extending from one rotatable support member to another rotatable support member in a continuous loop; and D. bonding/joining means positioned in association with the forming machine in cooperating relationship with the foam thermoplastic member for bonding the side surfaces of the elongated foam thermoplastic member as the side surfaces are brought into contact with each other, causing the surfaces to be securely affixed together;

whereby an elongated, hollow shaped foam thermoplastic member is produced having any desired length and any desired hollow shape.

37. The system defined in claim 36, wherein at least two of said rotatable support members are positioned with their respective central axes lying in the same horizontal plane and the outer surfaces thereof also define a single horizontal plane.

38. The method defined in claim 37, wherein at least three separate and independent rotatable support members are employed with the outer surface of one of said rotatable support members lying in a plane intersecting the plane defined by the outer surface of said at least two rotatable members.

39. The method defined in claim 37, wherein a plurality of separate and independent rotatable support members are employed to create a substantially enlarged, cylindrically shaped, hollow foam thermoplastic product using a minimum of floor space.

* * * * *